(12) United States Patent
Matsumura et al.

(10) Patent No.: US 10,407,617 B2
(45) Date of Patent: Sep. 10, 2019

(54) LIQUID CRYSTAL DISPLAY DEVICE AND LIQUID CRYSTAL COMPOSITION

(71) Applicants: JNC CORPORATION, Tokyo (JP); JNC PETROCHEMICAL CORPORATION, Tokyo (JP)

(72) Inventors: Yoshinari Matsumura, Chiba (JP); Masayuki Saito, Chiba (JP); Yoshimasa Furusato, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 38 days.

(21) Appl. No.: 15/114,074

(22) PCT Filed: Jan. 21, 2015

(86) PCT No.: PCT/JP2015/051440
§ 371 (c)(1),
(2) Date: Jul. 26, 2016

(87) PCT Pub. No.: WO2015/133194
PCT Pub. Date: Sep. 11, 2015

(65) Prior Publication Data
US 2017/0015905 A1    Jan. 19, 2017

(30) Foreign Application Priority Data
Mar. 7, 2014 (JP) ................................. 2014-044824

(51) Int. Cl.
| | | |
|---|---|---|
| *C09K 19/32* | (2006.01) | |
| *C09K 19/34* | (2006.01) | |
| *C09K 19/12* | (2006.01) | |
| *C09K 19/30* | (2006.01) | |
| *C09K 19/02* | (2006.01) | |
| *C09K 19/54* | (2006.01) | |
| *C09K 19/04* | (2006.01) | |

(52) U.S. Cl.
CPC ...... *C09K 19/3402* (2013.01); *C09K 19/0208* (2013.01); *C09K 19/0216* (2013.01); *C09K 19/12* (2013.01); *C09K 19/30* (2013.01); *C09K 19/3003* (2013.01); *C09K 19/3066* (2013.01); *C09K 19/3068* (2013.01); *C09K 19/3098* (2013.01); *C09K 19/542* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3422* (2013.01); *C09K 2019/3425* (2013.01); *C09K 2019/548* (2013.01)

(58) Field of Classification Search
CPC ..................................................... C09K 19/34
See application file for complete search history.

(56) References Cited

U.S. PATENT DOCUMENTS

| | | | |
|---|---|---|---|
| 9,261,733 B2 * | 2/2016 | Ogawa ............... | G02F 1/133711 |
| 2002/0015126 A1 * | 2/2002 | Tsuda .................... | G02F 1/1337 |
| | | | 349/129 |
| 2011/0272631 A1 | 11/2011 | Saito | |
| 2012/0069275 A1 | 3/2012 | Saito | |
| 2012/0161072 A1 * | 6/2012 | Saito ..................... | C09K 19/16 |
| | | | 252/299.61 |
| 2014/0010973 A1 * | 1/2014 | Gotoh ................ | C09K 19/3402 |
| | | | 428/1.2 |
| 2014/0043579 A1 | 2/2014 | Furusato et al. | |
| 2015/0299571 A1 | 10/2015 | Yanai et al. | |

FOREIGN PATENT DOCUMENTS

| | | | |
|---|---|---|---|
| JP | 02-064525 A1 * | 3/1990 | |
| JP | H0264525 | 3/1990 | |
| JP | 2000275645 | 10/2000 | |
| JP | 2008134291 | 6/2008 | |
| JP | 2008134291 A * | 6/2008 | |
| WO | 2010131594 | 11/2010 | |

(Continued)

OTHER PUBLICATIONS

"International Search Report (Form PCT/ISA/210)", dated Apr. 28, 2015, with English translation thereof, pp. 1-4.

(Continued)

*Primary Examiner* — Chanceity N Robinson
(74) *Attorney, Agent, or Firm* — JCIPRNET

(57) ABSTRACT

Shown is a liquid crystal display device including a first substrate, a second substrate and a liquid crystal composition having a nematic phase, which is placed between these substrates, wherein the liquid crystal composition includes at least one compound selected from compounds represented by formula (1) as a first component:

(1)

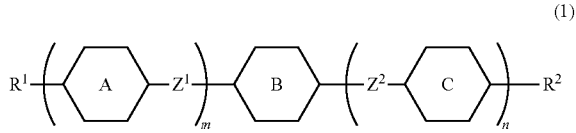

wherein in formula (1), $R^1$ and $R^2$ are alkyl or the like; ring A and ring C are 1,4-phenylene or the like; ring B is 2,3-difluoro-1,4-phenylene or the like; $Z^1$ and $Z^2$ are a single bond or the like; and m is 1, 2 or 3, n is 0 or 1, and the sum of m and n is 3 or less.

6 Claims, No Drawings

(56) References Cited

FOREIGN PATENT DOCUMENTS

| | | |
|---|---|---|
| WO | 2013175892 | 11/2013 |
| WO | 2014006963 | 1/2014 |
| WO | 2014024648 | 2/2014 |

OTHER PUBLICATIONS

"Office Action of Taiwan Counterpart Application" dated May 14, 2018, with English translation thereof, p. 1-14.
"Office Action of China Counterpart Application," with English translation thereof, dated May 3, 2018, p. 1-12.
"Office Action of Taiwan Counterpart Application," dated Dec. 11, 2018, with English translation thereof, p. 1-10.
"Office Action of China Counterpart Application," dated Dec. 3, 2018, with English translation thereof, p. 1-9.

* cited by examiner

LIQUID CRYSTAL DISPLAY DEVICE AND LIQUID CRYSTAL COMPOSITION

CROSS-REFERENCE TO RELATED APPLICATION

This application is a 371 application of the international PCT application serial no. PCT/JP2015/051440, filed on Jan. 21, 2015, which claims the priority benefit of Japan application no. 2014-044824, filed on Mar. 7, 2014. The entirety of each of the above-mentioned patent applications is hereby incorporated by reference herein and made a part of this specification.

TECHNICAL FIELD

The invention relates to a liquid crystal composition, a liquid crystal display device including this composition and so forth. It relates especially to a liquid crystal composition having negative dielectric anisotropy and a liquid crystal display device including this composition and having a mode such as IPS, VA, FFS or FPA. It also relates to a liquid crystal display device with a polymer sustained alignment type.

TECHNICAL BACKGROUND

In a liquid crystal display device, a classification based on an operating mode for liquid crystal molecules includes modes such as PC (phase change), TN (twisted nematic), STN (super twisted nematic), ECB (electrically controlled birefringence), OCB (optically compensated bend), IPS (in-plane switching), VA (vertical alignment), FFS (fringe field switching) and FPA (field-induced photo-reactive alignment). A classification based on a driving mode in the device includes PM (passive matrix) and AM (active matrix). The PM is classified into static, multiplex and so forth, and the AM is classified into TFT (thin film transistor), MIM (metal-insulator-metal) and so forth. The TFT is classified into amorphous silicon and polycrystal silicon. The latter is classified into a high temperature type and a low temperature type depending on the production process. A classification based on a light source includes a reflection type utilizing natural light, a transmission type utilizing a backlight and a semi-transmission type utilizing both natural light and a backlight.

The liquid crystal display device includes a liquid crystal composition having a nematic phase. This composition has suitable characteristics. An AM device having good characteristics can be obtained by improving the characteristics of this composition. Table 1 below summarizes the relationship between these two characteristics. The characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Response time that is one millisecond shorter than that of the other devices is desirable. Thus a small viscosity of the composition is desirable. A small viscosity at a low temperature is more desirable.

TABLE 1

Characteristics of Compositions and AM Devices

| No. | Characteristics of Compositions | Characteristics of AM Devices |
| --- | --- | --- |
| 1 | a wide temperature range of a nematic phase | a wide temperature range in which a device can be used |
| 2 | a small viscosity | a short response time |
| 3 | suitable optical anisotropy | a large contrast ratio |
| 4 | a large positive or large negative dielectric anisotropy | a low threshold voltage and low power consumption, a large contrast ratio |
| 5 | a large specific resistance | a large voltage holding ratio and a large contrast ratio |
| 6 | a high stability to ultraviolet light and heat | a long service life |

The optical anisotropy of the composition relates to the contrast ratio of the device. A large optical anisotropy or a small optical anisotropy, namely a suitable optical anisotropy, is necessary depending on the mode of the device. The product ($\Delta n \times d$) of the optical anisotropy ($\Delta n$) of the composition and the cell gap (d) of the device is designed so as to maximize the contrast ratio. A suitable value of the product depends on the type of operating mode. This value is in the range of approximately 0.30 micrometers to approximately 0.40 micrometers for a device having a VA mode, and in the range of approximately 0.20 micrometers to approximately 0.30 micrometers for a device having an IPS mode or an FFS mode. In these cases, a composition having a large optical anisotropy is desirable for a device having a small cell gap. A large dielectric anisotropy of the composition contributes to a low threshold voltage, low power consumption and a large contrast ratio of the device. A large dielectric anisotropy is thus desirable.

A large specific resistance of the composition contributes to a large voltage holding ratio and a large contrast ratio of the device. It is thus desirable that a composition should have a large specific resistance at a temperature close to the maximum temperature of a nematic phase as well as at room temperature in the initial stages. It is desirable that a composition should have a large specific resistance at a temperature close to the maximum temperature of a nematic phase as well as at room temperature, after it has been used for a long time. The stability of the composition to ultraviolet light and heat relates to the service life of the device. The device has a long service life when the stability is high. Characteristics of this kind are desirable for an AM device used for a liquid crystal projector, a liquid crystal television and so forth.

A liquid crystal composition including a polymer is used for a liquid crystal display device with a polymer sustained alignment (PSA) type. First, a composition to which a small amount of polymerizable compound has been added is poured into a device. Next, the composition is irradiated with ultraviolet light, while a voltage is applied between the substrates of this device. The polymerizable compound is polymerized to give a network structure of a polymer in the composition. In this composition, the polymer makes it possible to adjust the orientation of liquid crystal molecules, and thus the response time of the device is decreased and image burn-in is improved. Such effect of the polymer can be expected for a device having a mode such as TN, ECB, OCB, IPS, VA, FFS or FPA.

A composition having positive dielectric anisotropy is used for an AM device having a TN mode. A composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device with a polymer sustained alignment (PSA) type.

A flicker sometimes is generated on a display screen when a liquid crystal display device is used for a long time. The flicker relates to image burn-in, and it is estimated that the flicker is caused by the difference between electric potential of the positive frame and the negative frame when the device is driven by an alternating current. An improvement has been tried in order to suppress the generation of the flicker in view of the structure of the device or the component of the composition.

PRIOR ART

Patent Document

Patent document No. 1: WO 2010-131594 A.

SUMMARY OF THE INVENTION

Subject to be Solved by the Invention

The invention provides a liquid crystal display device that has characteristics such as a short response time, a large voltage holding ratio, a low threshold voltage, a large contrast ratio, a long service life and a small flicker rate. The invention further provides a liquid crystal composition that is used for such a device. The invention further provides a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. The invention further provides a liquid crystal composition that is suitably balanced between at least two of the characteristics.

Means for Solving the Subject

The invention relates to a liquid crystal display device including a first substrate and a second substrate and a liquid crystal composition placed between these substrates, wherein a flicker rate of the liquid crystal display device is in the range of 0% to 1%, and to a liquid crystal composition included in the device and to a liquid crystal compound included the composition.

Effect of the Invention

One of the advantages of the invention is to provide a liquid crystal display device that has characteristics such as a short response time, a large voltage holding ratio, a low threshold voltage, a large contrast ratio, a long service life and a small flicker rate. Another advantage is to provide a liquid crystal composition that is used for such a device. A further advantage is to provide a liquid crystal composition that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to ultraviolet light and a high stability to heat. A further advantage is to provide a liquid crystal composition that is suitably balanced between at least two of the characteristics.

EMBODIMENT TO CARRY OUT THE INVENTION

The usage of the terms in the specification and claims is as follows. "Liquid crystal composition" and "liquid crystal display device" are sometimes abbreviated to "composition" and "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, and for a compound having no liquid crystal phases but being mixed to a composition for the purpose of adjusting the characteristics, such as the temperature range of a nematic phase, the viscosity and the dielectric anisotropy. This compound has a six-membered ring such as 1,4-cyclohexylene or 1,4-phenylene, and its molecular structure is rod-like. "Polymerizable compound" is a compound that is added to a composition in order to form a polymer in it.

A liquid crystal composition is prepared by mixing a plurality of liquid crystal compounds. The ratio of a liquid crystal compound (content) is expressed as a percentage by weight (% by weight) based on the weight of this composition. An additive such as an optically active compound, an antioxidant, an ultraviolet light absorber, a coloring matter, an antifoaming agent, a polymerizable compound, a polymerization initiator and a polymerization inhibitor is added to this composition as required. The ratio of the additive (added amount) is expressed as a percentage by weight (% by weight) based on the weight of the liquid crystal composition in the same manner as with the liquid crystal compound. Weight parts per million (ppm) is sometimes used. The ratio of the polymerization initiator and the polymerization inhibitor is exceptionally expressed on the basis of the weight of the polymerizable compound.

"A higher limit of the temperature range of a nematic phase" is sometimes abbreviated to "the maximum temperature." "A lower limit of the temperature range of a nematic phase" is sometimes abbreviated to "the minimum temperature." That "specific resistance is large" means that a composition has a large specific resistance at a temperature close to the maximum temperature of a nematic phase as well as at room temperature in the initial stages, and that the composition has a large specific resistance at a temperature close to the maximum temperature of a nematic phase as well as at room temperature, after it has been used for a long time. That "a voltage holding ratio is large" means that a device has a large voltage holding ratio at a temperature close to the maximum temperature of a nematic phase as well as at room temperature in the initial stages, and that the device has a large voltage holding ratio at a temperature close to the maximum temperature of a nematic phase as well as at room temperature, after it has been used for a long time. The expression "increase the dielectric anisotropy" means that its value increases positively when the composition has positive dielectric anisotropy, and that its value increases negatively when the composition has negative dielectric anisotropy.

The expression "at least one 'A'" means that the number of 'A' is arbitrary. The expression "at least one 'A' may be replaced by 'B'" means that the position of 'A' is arbitrary when the number of 'A' is one. The positions can also be selected without restriction when the number of 'A' is two or more. This rule also applies to the expression "at least one 'A' has been replaced by 'B'." For example, the expression "in the alkyl, at least one —CH$_2$— may be replaced by —O— or —S—" includes groups such as —OCH$_3$, —CH$_2$OCH$_3$, —CH$_2$ OCH$_2$ CH$_2$ OCH$_3$, —SCH$_2$ CH$_2$ CH$_3$, —CH$_2$CH$_2$ SCH$_3$ and —CH$_2$OCH$_2$ CH$_2$ SCH$_3$. Incidentally, it is undesirable that two successive —CH$_2$— should be replaced by —O— to give —O—O—. It is also undesirable that —CH$_2$— of a methyl moiety (—CH$_2$—H) in alkyl and so forth should be replaced by —O— to give —O—H.

In formula (1) to (3), the symbol such as A, B or F surrounded by a hexagon corresponds to ring A, ring B or ring F, respectively. The hexagon represents a six-membered ring or a condensed ring. In compound (3), an oblique line crossing the hexagon of ring F means that the binding position of a P$^1$-Sp$^1$ group on the ring can be arbitrarily selected. The same rule applies to a P$^2$-Sp$^2$ group on ring G or the like. A subscript such as "a" shows the number of a group bonded to a ring such as ring F. Two P$^1$-Sp$^1$ groups are present on ring F when "a" is 2. Two groups represented by two P$^1$-Sp$^1$ groups may be the same or different. The same rule applies to arbitrary two when "a" is greater than 2. The same rule also applies to another group. A compound represented by formula (1) is sometimes abbreviated to "compound (1)." This abbreviation applies to a compound represented by formula (2) or the like. Compound (1) means one compound, a mixture of two compounds or a mixture of three or more compounds represented by formula (1).

The symbol for the terminal group, R$^1$, is used for a plurality of compounds in the chemical formulas of component compounds. In these compounds, two groups represented by two arbitrary R$^1$ may be the same or different. In one case, for example, R$^1$ of compound (1-1) is ethyl and R$^1$ of compound (1-2) is ethyl. In another case, R$^1$ of compound (1-1) is ethyl and R$^1$ of compound (1-2) is propyl. The same rule applies to symbols such as another terminal group. In formula (1), two of ring A are present when m is 2. In this compound, two groups represented by two of ring A may be the same or different. The same rule applies to arbitrary two of ring A, when m is greater than 2. The same rule also applies to symbols such as Z$^1$ and ring D.

2-Fluoro-1,4-phenylene means the two divalent groups described below. Fluorine may be facing left (L) or facing right (R) in a chemical formula. The same rule also applies to an asymmetric divalent group formed from a ring by removing two hydrogens, such as tetrahydropyran-2,5-diyl.

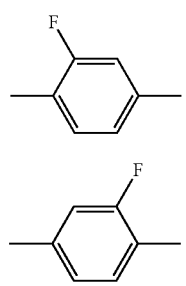

The invention includes the following items.
Item 1. A liquid crystal display device including a first substrate, a second substrate and a liquid crystal composition having a nematic phase, which is placed between these substrates, wherein a flicker rate is in the range of 0% to 1%.
Item 2. The liquid crystal display device according to item 1, wherein the liquid crystal composition includes at least one compound selected from the group of compounds represented by formula (1) as a first component:

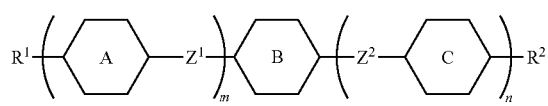

in formula (1), R$^1$ and R$^2$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by halogen; ring A and ring C are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl; ring B is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; Z$^1$ and Z$^2$ are independently a single bond, ethylene, carbonyloxy or methyleneoxy; m is 1, 2 or 3, n is 0 or 1, and the sum of m and n is 3 or less.

Item 3. The liquid crystal display device according to item 2, wherein the first component of the liquid crystal composition is at least one compound selected from the group of compounds represented by formula (1-1) to formula (1-20):

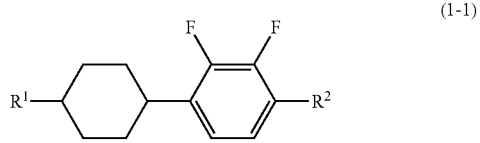

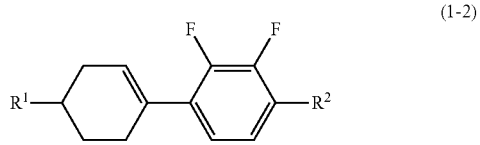

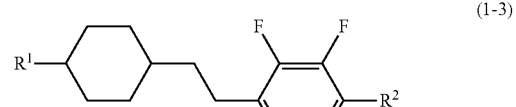

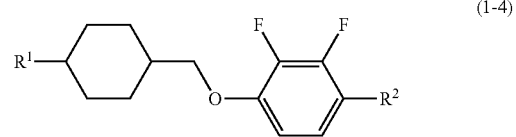

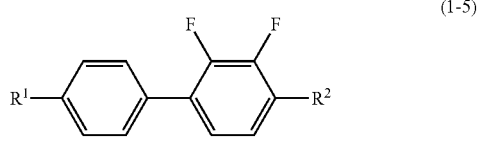

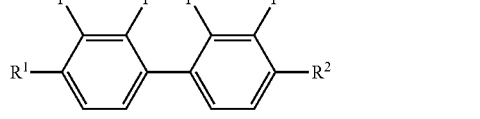

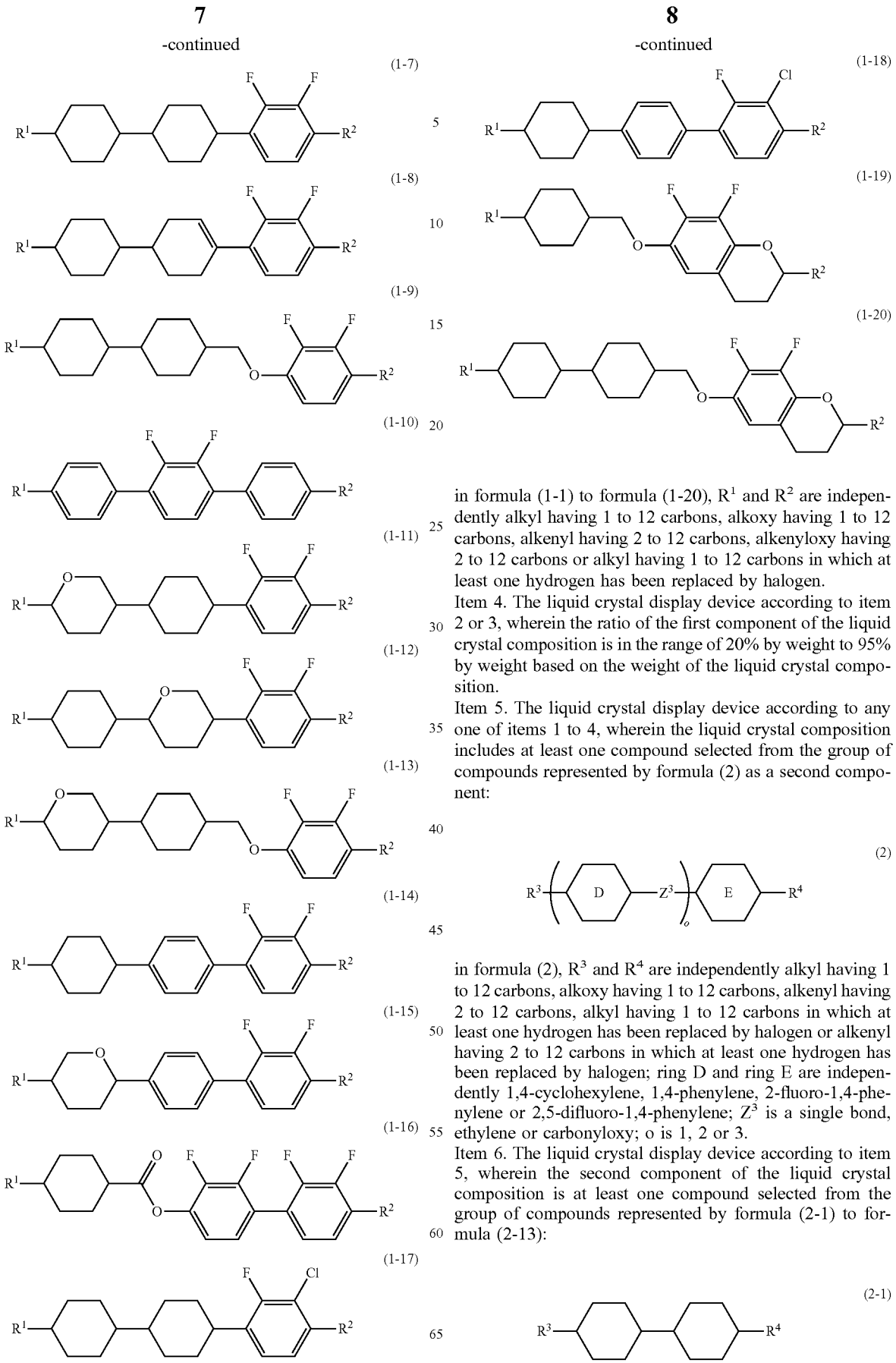

in formula (1-1) to formula (1-20), $R^1$ and $R^2$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by halogen.

Item 4. The liquid crystal display device according to item 2 or 3, wherein the ratio of the first component of the liquid crystal composition is in the range of 20% by weight to 95% by weight based on the weight of the liquid crystal composition.

Item 5. The liquid crystal display device according to any one of items 1 to 4, wherein the liquid crystal composition includes at least one compound selected from the group of compounds represented by formula (2) as a second component:

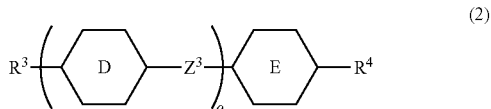

(2)

in formula (2), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen has been replaced by halogen or alkenyl having 2 to 12 carbons in which at least one hydrogen has been replaced by halogen; ring D and ring E are independently 1,4-cyclohexylene, 1,4-phenylene, 2-fluoro-1,4-phenylene or 2,5-difluoro-1,4-phenylene; $Z^3$ is a single bond, ethylene or carbonyloxy; o is 1, 2 or 3.

Item 6. The liquid crystal display device according to item 5, wherein the second component of the liquid crystal composition is at least one compound selected from the group of compounds represented by formula (2-1) to formula (2-13):

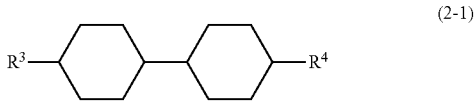

(2-1)

-continued

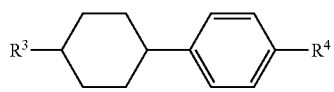 (2-2)

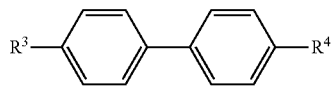 (2-3)

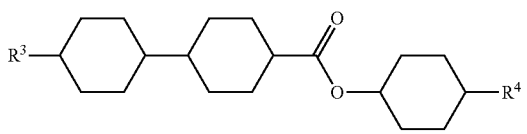 (2-4)

 (2-5)

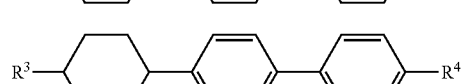 (2-6)

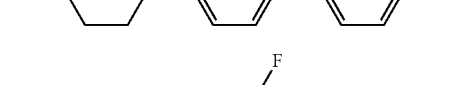 (2-7)

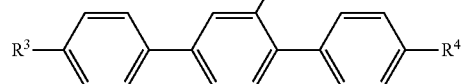 (2-8)

 (2-9)

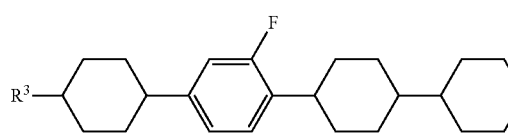 (2-10)

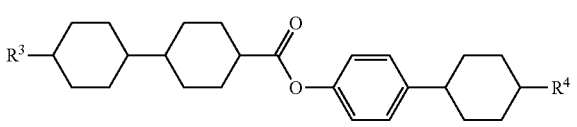 (2-11)

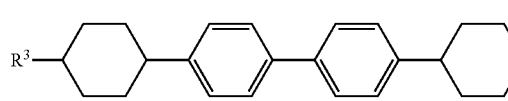 (2-12)

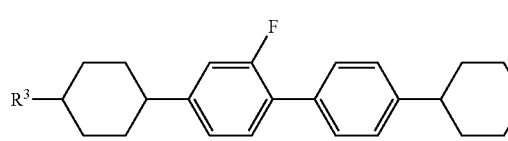 (2-13)

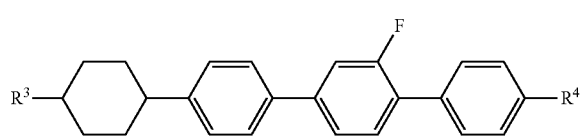

in formula (2-1) to formula (2-13), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen has been replaced by halogen or alkenyl having 2 to 12 carbons in which at least one hydrogen has been replaced by halogen.

Item 7. The liquid crystal display device according to item 5 or 6, wherein the ratio of the second component of the liquid crystal composition is in the range of 5% by weight to 80% by weight based on the weight of the liquid crystal composition.

Item 8. The liquid crystal display device according to any one of items 1 to 7, wherein the liquid crystal composition includes at least one polymerizable compound selected from the group of compounds represented by formula (3) as an additive component:

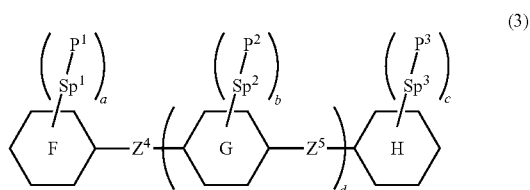 (3)

in formula (3), ring F and ring H are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings, at least one hydrogen may be replaced by halogen, alkyl having 1 to 12 carbons, alkoxy having 1 to 12 carbons or alkyl having 1 to 12 carbons in which at least one hydrogen has been replaced by halogen; ring G is 1,4-cyclohexylene, 1,4-cyclohexylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings, at least one hydrogen may be replaced by halogen, alkyl having 1 to 12 carbons, alkoxy having 1 to 12 carbons or alkyl having 1 to 12 carbons in which at least one hydrogen has been replaced by halogen; $Z^4$ and $Z^5$ are independently a single bond or alkylene having 1 to 10 carbons, and in the alkylene at least one —CH$_2$— may be replaced by —O—, —CO—, —COO— or —OCO—, at least one —CH$_2$—CH$_2$— may be replaced by —CH=CH—, —C(CH$_3$)=CH—, —CH=C (CH$_3$)— or —C(CH$_3$)=C (CH$_3$)—, and in these groups at least one hydrogen may be replaced by fluorine or chlorine; $P^1$, $P^2$ and $P^3$ are a polymerizable group; $Sp^1$, $Sp^2$ and $Sp^3$ are independently a single bond or alkylene having 1 to 10 carbons, and in the alkylene at least one —CH$_2$— may be replaced by —O—, —COO—, —OCO— or —OCOO—, at least one —CH$_2$—CH$_2$— may be replaced by —CH=CH— or —C≡C—, and in these groups at least one hydrogen may be replaced by fluorine or chlorine; d is 0, 1 or 2; a, b and c are independently 0, 1, 2, 3 or 4, and the sum of a, b and c is 1 or more.

Item 9. The liquid crystal display device according to item 8, wherein in formula (3), $p^1$, $P^2$ and $P^3$ are independently a polymerizable group selected from the group of groups represented by formula (P-1) to formula (P-6):

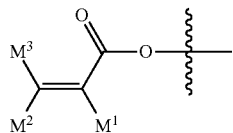
(P-1)

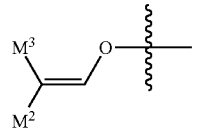
(P-2)

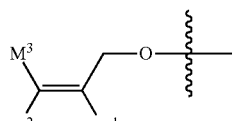
(P-3)

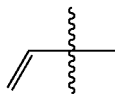
(P-4)

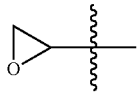
(P-5)

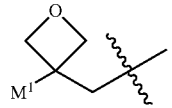
(P-6)

in formula (P-1) to formula (P-6), $M^1$, $M^2$ and $M^3$ are independently hydrogen, fluorine, alkyl having 1 to 5 carbons or alkyl having 1 to 5 carbons in which at least one hydrogen has been replaced by halogen; in formula (3), at least one of a numbers of $Sp^1$ and c numbers of $Sp^3$ is alkylene in which at least one —CH$_2$— has been replaced by —O—, —COO—, —OCO— or —OCOO— when all of a numbers of $P^1$ and c numbers of $P^3$ are group represented by formula (P-4).

Item 10. The liquid crystal display device according to item 8, wherein the additive component of the liquid crystal composition is at least one polymerizable compound selected from the group of compounds represented by formula (3-1) to formula (3-27):

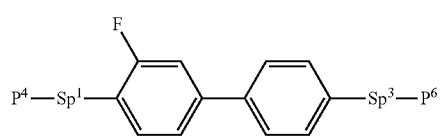
(3-1)

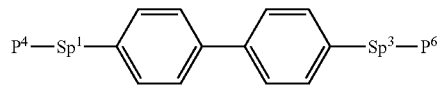
(3-2)

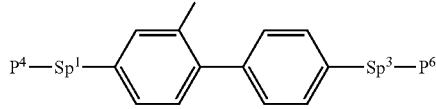
(3-3)

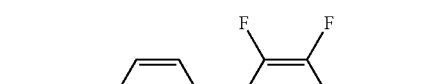
(3-4)

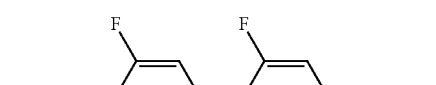
(3-5)

(3-6)

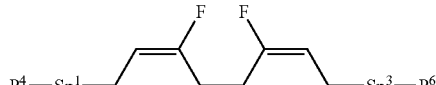
(3-7)

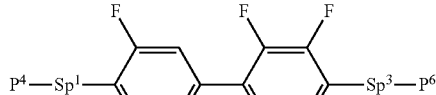
(3-8)

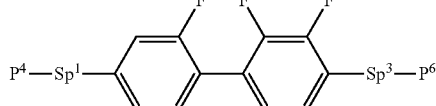
(3-9)

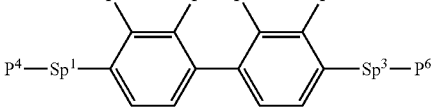
(3-10)

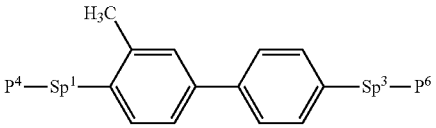
(3-11)

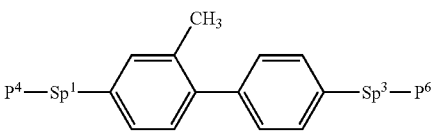
(3-12)

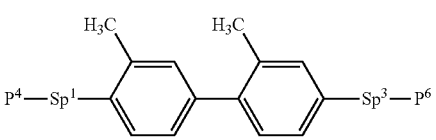
(3-13)

(3-14)
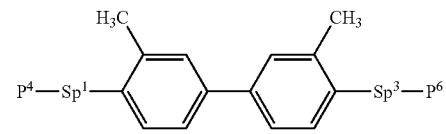
(3-15)
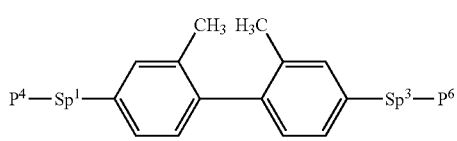
(3-16)
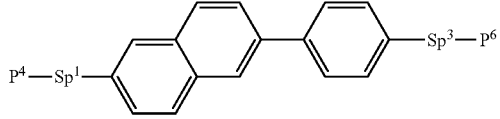
(3-17)
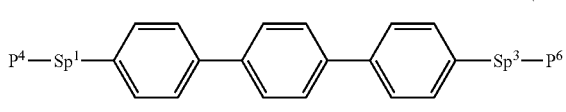
(3-18)
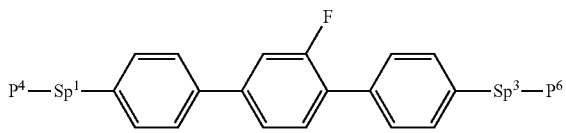
(3-19)
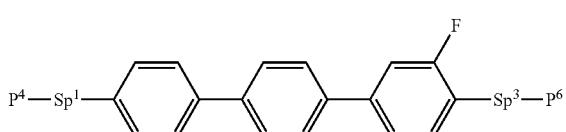
(3-20)
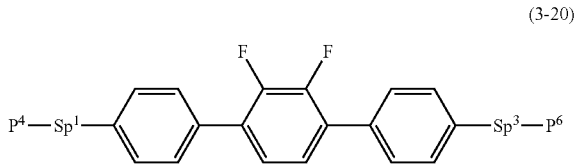
(3-21)
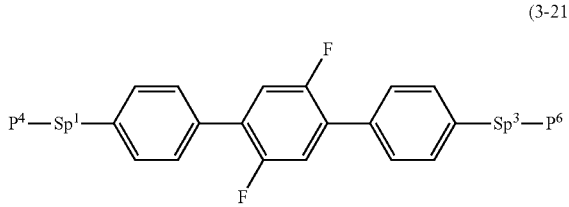
(3-22)
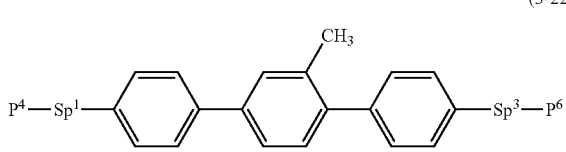
(3-23)
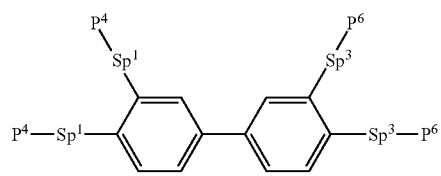
(3-24)
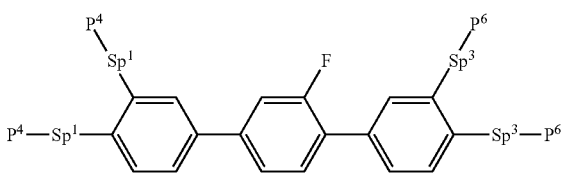
(3-25)
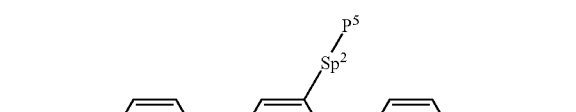
(3-26)
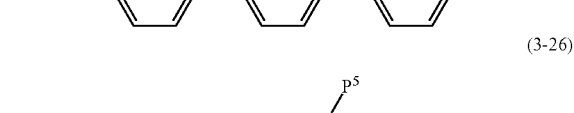
(3-27)
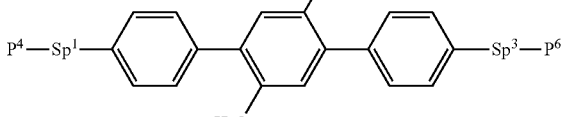
in formula (3-1) to formula (3-27), $P^4$, $P^5$ and $P^6$ are independently a polymerizable group selected from the group of groups represented by formula (P-1) to formula (P-3):
(P-1)
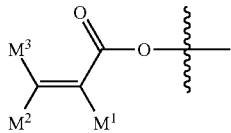
(P-2)
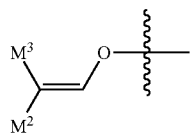
(P-3)
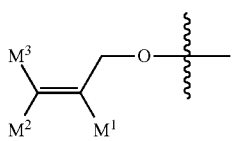
in formula (P-1) to formula (P-3), $M^1$, $M^2$ and $M^3$ are independently hydrogen, fluorine, alkyl having 1 to 5 carbons or alkyl having 1 to 5 carbons in which at least one hydrogen has been replaced by halogen; in formula (3-1) to formula (3-27), Sp$^1$, Sp$^2$ and Sp$^3$ are independently a single bond or alkylene having 1 to 10 carbons, and in the alkylene at least one —CH$_2$— may be replaced by —O—, —COO—, —OCO— or —OCOO—, at least one —CH$_2$—CH$_2$— may be replaced by —CH═CH— or —C≡C—, and in these groups at least one hydrogen may be replaced by fluorine or chlorine.

Item 11. The liquid crystal display device according to any one of items 8 to 10, wherein the ratio of the additive component of the liquid crystal composition is in the range of 0.03% by weight to 10% by weight based on the weight of the liquid crystal composition.

Item 12. The liquid crystal display device according to any one of items 1 to 11, wherein in the liquid crystal composition, the maximum temperature of a nematic phase is 70° C. or higher, the optical anisotropy (measured at 25° C.) at a wavelength of 589 nanometers is 0.07 or more, and the dielectric anisotropy (measured at 25° C.) at a frequency of 1 kHz is −2 or less.

Item 13. The liquid crystal display device according to any one of items 1 to 12, wherein an operating mode of the liquid crystal display device is a TN mode, an ECB mode, an OCB mode, an IPS mode, a VA mode, an FFS mode or an FPA mode, and a driving mode of the liquid crystal display device is an active matrix mode.

Item 14. The liquid crystal display device according to any one of items 1 to 12, wherein an operating mode of the liquid crystal display device is an IPS mode or an FFS mode, and a driving mode of the liquid crystal display device is an active matrix mode.

Item 15. A liquid crystal display device with a polymer sustained alignment type including the liquid crystal composition according to any one of items 8 to 11, or wherein the additive component in the liquid crystal composition is polymerized.

Item 16. A liquid crystal composition included in the liquid crystal display device according to any one of items 1 to 15.

Item 17. Use of the liquid crystal composition according to item 16 for the liquid crystal display device.

The invention also includes the following items. (a) The composition described above, further including at least one of additives such as an optically active compound, an antioxidant, an ultraviolet light absorber, a coloring matter, an antifoaming agent, a polymerizable compound, a polymerization initiator and a polymerization inhibitor. (b) The AM device including the composition described above. (c) An AM device with a polymer sustained alignment (PSA) type, including the composition described above that further includes a polymerizable compound. (d) An AM device with a polymer sustained alignment (PSA) type including the composition described above, where a polymerizable compound in this composition is polymerized. (e) A device including the composition described above where a polymerizable compound in this composition is polymerized, and having a mode of PC, TN, STN, ECB, OCB, IPS, VA, FFS or FPA. (f) A transmission-type device including the composition described above and a polymerizable compound in this composition is polymerized. (g) Use of the composition described above, as a composition having a nematic phase. (h) Use of the composition prepared by the addition of an optically active compound to the composition described above, as an optically active composition.

The invention also includes the following items. (i) The liquid crystal display device including the liquid crystal composition described above, wherein the liquid crystal composition includes at least one compound selected from the group of compounds represented by formula (1-1) to formula (1-20) as the first component, and the total weight of compounds represented by formula (1-1), formula (1-2), formula (1-3), formula (1-5), formula (1-7), formula (1-8), formula (1-10), formula (1-14), formula (1-17) and formula (1-18) is in the range of 50% by weight to 100% by weight based on the weight of the first component. (j) The liquid crystal display device including the liquid crystal composition described above, wherein the total weight of compounds represented by formula (1-1), formula (1-2), formula (1-3), formula (1-5), formula (1-7), formula (1-8), formula (1-10), formula (1-14), formula (1-17) and formula (1-18) is in the range of 10% by weight to 80% by weight based on the weight of the liquid crystal composition. (k) The liquid crystal display device including the liquid crystal composition described above, wherein the total weight of compounds represented by formula (1-1), formula (1-2), formula (1-3), formula (1-5), formula (1-7), formula (1-8), formula (1-10), formula (1-14), formula (1-17) and formula (1-18) is in the range of 20% by weight to 60% by weight based on the weight of the liquid crystal composition.

The liquid crystal display device of the invention includes a first substrate, a second substrate and a liquid crystal composition having a nematic phase that is placed between these substrates, wherein the flicker rate of the liquid crystal display device is in the range of 0% to 1%. The flicker rate (%) is expressed by [|(brightness when positive voltage is applied)−(brightness when negative voltage is applied)|]/average brightness×100. The flicker relates to image burn-in, and it is estimated that the flicker is caused by the difference between electric potential of the positive frame and the negative frame when the device is driven by an alternating current. The generation of the flicker can be suppressed by suitably selecting the component of the composition included in the device.

The composition of the invention will be explained in the following order: First, the constitution of component compounds in the composition will be explained. Second, the main characteristics of the component compounds and the main effects of these compounds on the composition will be explained. Third, a combination of the components in the composition, a desirable ratio of the components and its basis will be explained. Fourth, a desirable embodiment of the component compounds will be explained. Fifth, desirable component compounds will be shown. Sixth, additives that may be added to the composition will be explained. Seventh, methods for synthesizing the component compounds will be explained. Last, the use of the composition will be explained.

First, the constitution of component compounds in the composition will be explained. The compositions of the invention are classified into composition A and composition B. Composition A may further include any other liquid crystal compound, an additive and so forth, in addition to liquid crystal compounds selected from compound (1) and compound (2). "Any other liquid crystal compound" is a liquid crystal compound that is different from compound (1) and compound (2). Such a compound is mixed with the composition for the purpose of further adjusting the characteristics. The additive includes an optically active compound, an antioxidant, an ultraviolet light absorber, a coloring matter, an antifoaming agent, a polymerizable compound, a polymerization initiator and a polymerization inhibitor.

Composition B consists essentially of liquid crystal compounds selected from compound (1) and compound (2). The term "essentially" means that the composition may include an additive, but does not include any other liquid crystal compound. Composition B has a smaller number of components than composition A. Composition B is preferable to composition A in view of cost reduction. Composition A is preferable to composition B in view of the fact that characteristics can be further adjusted by mixing with any other liquid crystal compound.

Second, the main characteristics of the component compounds and the main effects of these compounds on the characteristics of the composition will be explained. Table 2 summarizes the main characteristics of the component compounds based on the effects of the invention. In Table 2, the symbol L stands for "large" or "high", the symbol M stands for "medium", and the symbol S stands for "small" or "low." The symbols L, M and S mean a classification based on a qualitative comparison among the component compounds, and the symbol 0 means that the value is zero or close to zero.

TABLE 2

Characteristics of Compounds

| Compounds | Compound (1) | Compound (2) |
| --- | --- | --- |
| Maximum Temperature | S-M | S-L |
| Viscosity | L | S-M |
| Optical Anisotropy | M-L | S-L |
| Dielectric Anisotropy | M-L[1)] | 0 |
| Specific Resistance | L | L |

[1)]The value of dielectric anisotropy is negative, and the symbol expresses the magnitude of the absolute value.

The main effects of the component compounds on the characteristics of the composition upon mixing the component compounds with the composition are as follows. Compound (1) increases the dielectric anisotropy, and decreases the minimum temperature. Compound (2) decreases the viscosity or increases the maximum temperature. Compound (3) gives a polymer by polymerization, and this polymer decreases the response time of a device, and improves image burn-in.

Third, a combination of the components in the composition, a desirable ratio of the components and its basis will be explained. A combination of the components in the composition is the first and second components, the first and additive components or the first, second and additive components. A desirable combination of the components is the first and second components or the first, second and additive components.

A desirable ratio of the first component is approximately 20% by weight or more for increasing the dielectric anisotropy, and approximately 95% by weight or less for decreasing the minimum temperature. A more desirable ratio is in the range of approximately 25% by weight to approximately 80% by weight. An especially desirable ratio is in the range of approximately 30% by weight to approximately 75% by weight.

A desirable ratio of the second component is approximately 5% by weight or more for increasing the maximum temperature or for decreasing the viscosity, and approximately 80% by weight or less for increasing the dielectric anisotropy. A more desirable ratio is in the range of approximately 20% by weight to approximately 75% by weight. An especially desirable ratio is in the range of approximately 25% by weight to approximately 70% by weight.

Compound (3) is added to the composition for adjusting to a device with a polymer sustained alignment type. A desirable ratio of the additive is approximately 0.03% by weight or more for orienting liquid crystal molecules, and approximately 10% by weight or less for preventing a poor display of a device. A more desirable ratio is in the range of approximately 0.1% by weight to approximately 2% by weight. An especially desirable ratio is in the range of approximately 0.2% by weight to approximately 1% by weight.

Fourth, a desirable embodiment of the component compounds will be explained. Both compound (1) and compound (2) is explained. $R^1$ and $R^2$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by halogen. Desirable $R^1$ or $R^2$ is alkyl having 1 to 12 carbons for increasing the stability, and alkoxy having 1 to 12 carbons for increasing the dielectric anisotropy. $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen has been replaced by halogen or alkenyl having 2 to 12 carbons in which at least one hydrogen has been replaced by halogen. Desirable $R^3$ or $R^4$ is alkenyl having 2 to 12 carbons for decreasing the viscosity, and alkyl having 1 to 12 carbons for increasing the stability.

In $R^1$ to $R^4$, the alkyl is straight-chain or branched-chain, and does not include cycloalkyl. Straight-chain alkyl is preferable to branched-chain alkyl. These apply also to alkoxy, alkenyl, alkenyloxy, alkyl in which hydrogen has been replaced by halogen and alkenyl in which hydrogen has been replaced by halogen. Halogen means fluorine, chlorine, bromine and iodine. Desirable halogen is fluorine and chlorine. More desirable halogen is fluorine.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity. Cis is preferable in the alkenyl such as 2-butenyl, 2-pentenyl and 2-hexenyl.

Desirable alkenyloxy is vinyloxy, allyloxy, 3-butenyloxy, 3-pentenyloxy or 4-pentenyloxy. More desirable alkenyloxy is allyloxy or 3-butenyloxy for decreasing the viscosity.

Desirable examples of alkyl in which at least one hydrogen has been replaced by halogen are fluoromethyl, 2-fluoroethyl, 3-fluoropropyl, 4-fluorobutyl, 5-fluoropentyl, 6-fluorohexyl, 7-fluoroheptyl or 8-fluorooctyl. More desirable examples are 2-fluoroethyl, 3-fluoropropyl, 4-fluorobutyl or 5-fluoropentyl for increasing the dielectric anisotropy.

Desirable examples of alkenyl in which at least one hydrogen has been replaced by halogen are 2,2-difluorovinyl, 3,3-difluoro-2-propenyl, 4,4-difluoro-3-butenyl, 5,5-difluoro-4-pentenyl or 6,6-difluoro-5-hexenyl. More desirable examples are 2,2-difluorovinyl or 4,4-difluoro-3-butenyl for decreasing the viscosity.

Ring A and ring C are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl. Desirable examples of "1,4-phenylene in which at least one hydrogen has been replaced by fluorine or chlorine" are 2-fluoro-1,4-phenylene, 2,3-difluoro-1,4-phenylene or 2-chloro-3-fluoro-1,4-phenylene. Desirable ring A or ring C is 1,4-cyclohexylene for decreasing the viscosity, and tetrahydropyran-2,5-diyl for increasing the dielectric anisotropy, and 1,4-phenylene for increasing the optical anisotropy. With regard to the configuration of 1,4-cyclohexylene, trans is preferable to cis for increasing the maximum temperature. Tetrahydropyran-2,5-diyl is

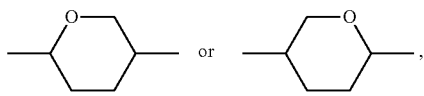

preferably

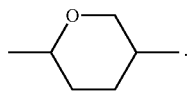

Ring B is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Desirable ring B is 2,3-difluoro-1,4-phenylene for decreasing the viscosity, and 2-chloro-3-fluoro-1,4-phenylene for decreasing the optical anisotropy, and 7,8-difluorochroman-2,6-diyl for increasing the dielectric anisotropy.

Ring D and ring E are independently 1,4-cyclohexylene, 1,4-phenylene, 2-fluoro-1,4-phenylene or 2,5-difluoro-1,4-phenylene. Desirable ring D or ring E is 1,4-cyclohexylene for decreasing the viscosity or for increasing the maximum temperature, and 1,4-phenylene for decreasing the minimum temperature.

$Z^1$ and $Z^2$ are independently a single bond, ethylene, carbonyloxy or methyleneoxy. Desirable $Z^1$ or $Z^2$ is a single bond for decreasing the viscosity, and ethylene for decreasing the minimum temperature, and methyleneoxy for increasing the dielectric anisotropy. $Z^3$ is a single bond, ethylene or carbonyloxy. Desirable $Z^3$ is a single bond for increasing the stability.

m is 1, 2 or 3, n is 0 or 1, and the sum of m and n is 3 or less. Desirable m is 1 for decreasing the viscosity, and is 2 or 3 for increasing the maximum temperature. Desirable n is 0 for decreasing the viscosity, and is 1 for decreasing the minimum temperature. o is 1, 2 or 3. Desirable o is 1 for decreasing the viscosity, and 2 or 3 for increasing the maximum temperature.

In compound (3), $P^1$, $P^2$ and $P^3$ are a polymerizable group. Desirable $P^1$, $P^2$ or $P^3$ is a polymerizable group selected from the group of groups represented by formula (P-1) to formula (P-6). In formula (P-1) to formula (P-6), a wavy line shows a binding site. More desirable $P^1$, $P^2$ or $P^3$ is formula (P-1), formula (P-2) or formula (P-3). Especially desirable $P^1$, $P^2$ or $P^3$ is formula (P-1) or formula (P-2). The most desirable $P^1$, $P^2$ or $P^3$ is formula (P-1), and in the group a more desirable one is —OCO—CH=CH$_2$ or —OCO—C(CH$_3$)=CH$_2$.

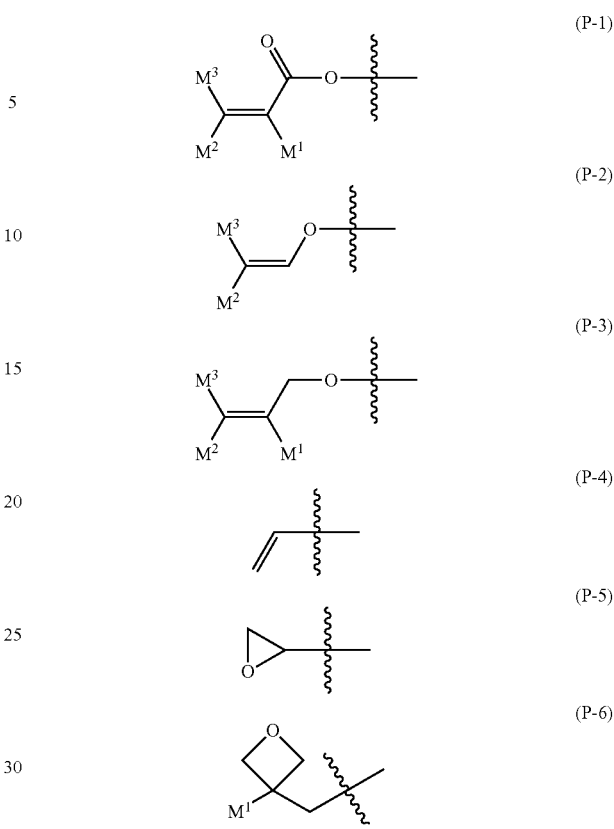

In formula (P-1) to formula (P-6), $M^1$, $M^2$ and $M^3$ are independently hydrogen, fluorine, alkyl having 1 to 5 carbons or alkyl having 1 to 5 carbons in which at least one hydrogen has been replaced by halogen. Desirable alkyl is methyl, ethyl or propyl. More desirable alkyl is methyl. Desirable examples of alkyl in which at least one hydrogen has been replaced by halogen are fluoromethyl, 2-fluoroethyl or 3-fluoropropyl. More desirable examples of alkyl in which at least one hydrogen has been replaced by halogen are fluoromethyl. Desirable $M^1$, $M^2$ or $M^3$ is hydrogen or methyl for increasing the reactivity. More desirable $M^1$ is methyl, and more desirable $M^2$ or $M^3$ is hydrogen. Two groups represented by arbitrary two $M^1$ may be the same or different when compound (3) has a plurality of polymerizable groups selected from the group of groups represented by formula (P-1) to formula (P-6). The same rule applies also to $M^2$ or $M^3$.

In compound (3), at least one of a numbers of Sp$^1$ and c numbers of Sp$^3$ is alkylene in which at least one —CH$_2$— has been replaced by —O—, —COO—, —OCO— or —OCOO— when all of a numbers of P$^1$ and c numbers of P$^3$ are formula (P-4). That is to say, there is no possibility that all of a numbers of P$^1$ and c numbers of P$^3$ are alkenyl such as 1-propenyl.

Sp$^1$, Sp$^2$ and Sp$^3$ are independently a single bond or alkylene having 1 to 10 carbons, and in the alkylene at least one —CH$_2$— may be replaced by —O—, —COO—, —OCO— or —OCOO—, at least one —CH$_2$—CH$_2$— may be replaced by —CH=CH— or —C≡C—, and in these groups at least one hydrogen may be replaced by fluorine or chlorine. Desirable Sp$^1$, Sp$^2$ or Sp$^3$ is a single bond, alkylene having 1 to 10 or alkylene in which one or two —CH$_2$— has been replaced by —O—, —COO— or —OCO—. More desirable $Sp^1$, $Sp^2$ or $Sp^3$ is a single bond, alkylene having 1 to 6 or alkylene in which one —$CH_2$— has been replaced by —O—. Especially desirable $Sp^1$, $Sp^2$ or $Sp^3$ is a single bond. Incidentally, in -$Sp^1$-$P^1$ formed by bonding -$Sp^1$- and —$P^1$, a group having an oxygen-oxygen bond such as $M^2M^3C$=CH—O—O— is undesirable.

Ring F and ring H are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings, at least one hydrogen may be replaced by halogen, alkyl having 1 to 12 carbons, alkoxy having 1 to 12 carbons or alkyl having 1 to 12 carbons in which at least one hydrogen has been replaced by halogen. Halogen means fluorine, chlorine, bromine and iodine. Desirable halogen is fluorine and chlorine. More desirable halogen is fluorine. Desirable ring F or ring H is phenyl, 2-fluorophenyl, 3-fluorophenyl, or 4-fluorophenyl. More desirable ring F or ring H is phenyl. Ring G is 1,4-cyclohexylene, 1,4-cyclohexylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings, at least one hydrogen may be replaced by halogen, alkyl having 1 to 12 carbons, alkoxy having 1 to 12 carbons or alkyl having 1 to 12 carbons in which at least one hydrogen has been replaced by halogen. Desirable ring G is 1,4-phenylene, 2-fluoro-1,4-phenylene, 2,3-difluoro-1,4-phenylene, 2,5-difluoro-1,4-phenylene or 2,6-difluoro-1,4-phenylene. More desirable ring G is 1,4-phenylene or 2-fluoro-1,4-phenylene.

$Z^4$ and $Z^5$ are independently a single bond or alkylene having 1 to 10 carbons, and in the alkylene at least one —$CH_2$— may be replaced by —O—, —CO—, —COO— or —OCO—, at least one —$CH_2$—$CH_2$— may be replaced by —CH=CH—, —C($CH_3$)=CH—, —CH=C($CH_3$)— or —C($CH_3$)=C($CH_3$)—, and in these groups at least one hydrogen may be replaced by fluorine or chlorine. Desirable $Z^4$ or $Z^5$ is a single bond, —$CH_2CH_2$—, —$CH_2O$—, —$OCH_2$—, —COO— or —OCO—. More desirable $Z^4$ or $Z^5$ is a single bond.

d is 0, 1 or 2. Desirable d is 0 or 1. a, b and c are independently 0, 1, 2, 3 or 4, and the sum of a, b and c is 1 or more. Desirable a, b or c is 1 or 2.

Fifth, desirable component compounds will be shown. The first component is compound (1) in which the dielectric anisotropy is negative. Desirable compound (1) is compound (1-1) to compound (1-20) described in item 3. Desirable compounds in view of suppressing the flicker are as follows. Compounds having a single bond or ethylene are preferable to compounds having methyleneoxy. Compounds having 1,4-cyclohexylene or 1,4-phenylene are preferable to compounds having tetrahydropyran-2,5-diyl. More desirable compounds are specifically compound (1-1), compound (1-2), compound (1-3), compound (1-5), compound (1-7), compound (1-8), compound (1-10), compound (1-14), compound (1-17) and compound (1-18). It is desirable that the total weight of these compounds should be in the range of 50% by weight to 100% by weight based on the weight of the first component. It is desirable that the total weight of these compounds should be in the range of 10% by weight to 80% by weight based on the weight of the liquid crystal composition. It is more desirable that the total weight of these compounds should be in the range of 20% by weight to 60% by weight based on the weight of the liquid crystal composition.

The second component is compound (2) in which the dielectric anisotropy is zero or close to zero. Desirable compound (2) is compound (2-1) to compound (2-13) described in item 6. In these compounds, it is desirable that at least of the second component should be compound (2-1), compound (2-3), compound (2-5), compound (2-6) or compound (2-7). It is desirable that at least two of the second component should be a combination of compound (2-1) and compound (2-3), or compound (2-1) and compound (2-5).

Desirable compound (3) is compound (3-1) to compound (3-27) described in item 10. In these compounds, it is desirable that at least one of the additive component is compound (3-1), compound (3-2), compound (3-24), compound (3-25), compound (3-26) or compound (3-27). It is desirable that at least two of the additive component are a combination of compound (3-1) and compound (3-2), compound (3-1) and compound (3-18), compound (3-2) and compound (3-24), compound (3-2) and compound (3-25), compound (3-2) and compound (3-26), compound (3-25) and compound (3-26) or compound (3-18) and compound (3-24). In formula (P-1) to formula (P-3), desirable $M^1$, $M^2$ or $M^3$ is hydrogen or methyl. Desirable $Sp^1$, $Sp^2$ or $Sp^3$ is a single bond, —$CH_2CH_2$—, —$CH_2O$—, —$OCH_2$—, —COO—, —OCO—, —CO—CH=CH— or —CH=CH—CO—.

Sixth, additives that may be added to the composition will be explained. Such additives include an optically active compound, an antioxidant, an ultraviolet light absorber, a coloring matter, an antifoaming agent, a polymerizable compound, a polymerization initiator and a polymerization inhibitor. The optically active compound is added to the composition for the purpose of inducing the helical structure of liquid crystal molecules and giving a twist angle. Examples of such compounds include compound (4-1) to compound (4-5). A desirable ratio of the optically active compound is approximately 5% by weight or less, and a more desirable ratio is in the range of approximately 0.01% by weight to approximately 2% by weight.

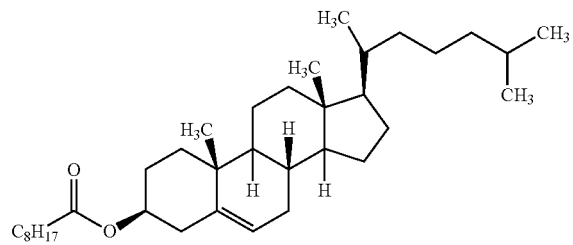
(4-1)

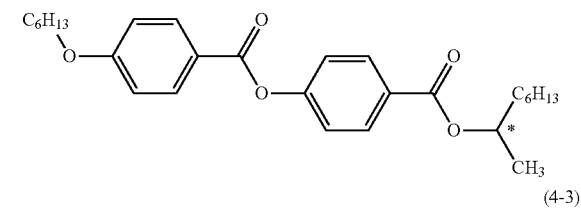
(4-2)

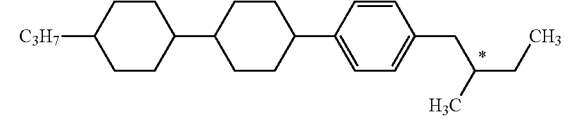
(4-3)

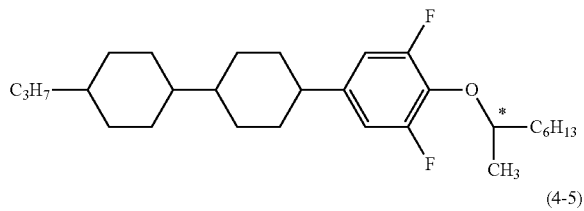

(4-4)

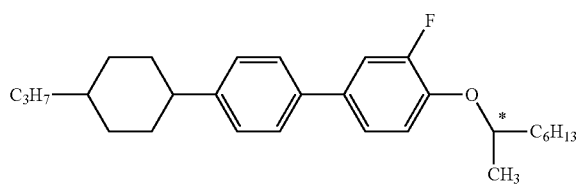

(4-5)

The antioxidant is added to the composition in order to prevent a decrease in specific resistance that is caused by heating under air, or to maintain a large voltage holding ratio at a temperature close to the maximum temperature as well as at room temperature, after the device has been used for a long time. A desirable example of the antioxidant is compound (5) where n is an integer from 1 to 9, for instance.

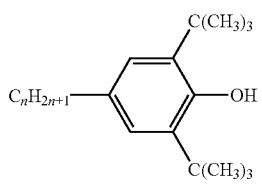

(5)

In compound (5), desirable n is 1, 3, 5, 7 or 9. More desirable n is 7. Compound (5) where n is 7 is effective in maintaining a large voltage holding ratio at a temperature close to the maximum temperature as well as at room temperature, after the device has been used for a long time, since it has a small volatility. A desirable ratio of the antioxidant is approximately 50 ppm or more for achieving its effect and is approximately 600 ppm or less for avoiding a decrease in the maximum temperature or avoiding an increase in the minimum temperature. A more desirable ratio is in the range of approximately 100 ppm to approximately 300 ppm.

Desirable examples of the ultraviolet light absorber include benzophenone derivatives, benzoate derivatives and triazole derivatives. A light stabilizer such as an amine having steric hindrance is also desirable. A desirable ratio of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable ratio is in the range of approximately 100 ppm to approximately 10,000 ppm.

A dichroic dye such as an azo dye or an anthraquinone dye is added to the composition for adjusting to a device having a guest host (GH) mode. A desirable ratio of the coloring matter is in the range of approximately 0.01% by weight to approximately 10% by weight. The antifoaming agent such as dimethyl silicone oil or methyl phenyl silicone oil is added to the composition for preventing foam formation. A desirable ratio of the antifoaming agent is approximately 1 ppm or more for achieving its effect and is approximately 1,000 ppm or less for avoiding a poor display. A more desirable ratio is in the range of approximately 1 ppm to approximately 500 ppm.

The polymerizable compound is used for adjusting to a device with a PSA (polymer sustained alignment) type. Compound (3) is suitable for this purpose. A polymerizable compound that is different from compound (3) may be added to the composition, together with compound (3). Desirable examples of such a polymerizable compound include compounds such as acrylates, methacrylates, vinyl compounds, vinyloxy compounds, propenyl ethers, epoxy compounds (oxiranes, oxetanes) and vinyl ketones. More desirable examples are acrylate derivatives or methacrylate derivatives. A desirable ratio of compound (3) is 10% by weight or more based on the total weight of the polymerizable compound. A more desirable ratio is 50% by weight or more. An especially desirable ratio is 80% by weight or more. An especially desirable ratio is also 100% by weight.

A polymerizable compound such as compound (3) is polymerized on irradiation with ultraviolet light. It may be polymerized in the presence of an initiator such as a photopolymerization initiator. Suitable conditions for polymerization, and a suitable type and amount of the initiator are known to a person skilled in the art, and are described in the literature. For example, Irgacure 651 (registered trademark; BASF), Irgacure 184 (registered trademark; BASF) or Darocur 1173 (registered trademark; BASF), each of which is a photoinitiator, is suitable for radical polymerization. A desirable ratio of the photopolymerization initiator is in the range of approximately 0.1% by weight to approximately 5% by weight based on the weight of the polymerizable compound. A more desirable ratio is in the range of approximately 1% by weight to approximately 3% by weight.

The polymerization inhibitor may be added in order to prevent the polymerization when a polymerizable compound such as compound (3) is kept in storage. The polymerizable compound is usually added to the composition without removing the polymerization inhibitor. Examples of the polymerization inhibitor include hydroquinone derivatives such as hydroquinone and methylhydroquinone, 4-tert-butylcatechol, 4-methoxyphenol and phenothiazine.

Seventh, methods for synthesizing the component compounds will be explained. These compounds can be synthesized by known methods. The synthetic methods will be exemplified. Compound (1-7) is prepared by the method described in JP 2000-53602 A. Compound (2-1) is prepared by the method described in JP S59-176221 A (1984). A compound of formula (5) where n is 1 is available from Sigma-Aldrich Corporation. Compound (5) where n is 7, for instance, is synthesized according to the method described in U.S. Pat. No. 3,660,505.

Compounds whose synthetic methods are not described here can be prepared according to the methods described in books such as "Organic Syntheses" (John Wiley & Sons, Inc.), "Organic Reactions" (John Wiley & Sons, Inc.), "Comprehensive Organic Synthesis" (Pergamon Press), and "Shin-Jikken Kagaku Kouza" (New experimental Chemistry Course, in English; Maruzen Co., Ltd., Japan). The composition is prepared according to known methods using the compounds thus obtained. For example, the component compounds are mixed and dissolved in each other by heating.

Last, the use of the composition will be explained. The composition mainly has a minimum temperature of approximately −10° C. or lower, a maximum temperature of approximately 70° C. or higher, and an optical anisotropy in the range of approximately 0.07 to approximately 0.20. A composition having an optical anisotropy in the range of approximately 0.08 to approximately 0.25 may be prepared by adjusting the ratio of the component compounds or by mixing with any other liquid crystal compound. A composition having an optical anisotropy in the range of approximately 0.10 to approximately 0.30 may be prepared by trial and error. A device including this composition has a large voltage holding ratio. This composition is suitable for an AM device. This composition is suitable especially for an AM device having a transmission type. This composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, FFS, VA and FPA. It is especially desirable to use the composition for the AM device having a mode of TN, OCB, IPS or FFS. In the AM device having the IPS or FFS mode, the orientation of liquid crystal molecules may be parallel or perpendicular to the glass substrate, when no voltage is applied. These devices may be of a reflection type, a transmission type or a semi-transmission type. It is desirable to use the composition for a device having the transmission type. The composition can be used for an amorphous silicon-TFT device or a polycrystal silicon-TFT device. The composition is also usable for an NCAP (nematic curvilinear aligned phase) device prepared by microcapsulating the composition, and for a PD (polymer dispersed) device in which a three-dimensional network-polymer is formed in the composition.

EXAMPLES

The invention will be explained in more detail by way of examples. The invention is not limited to the examples. The invention includes a mixture of the composition in Example 1 and the composition in Example 2. The invention also includes a mixture prepared by mixing at least two compositions in Examples. Compounds prepared herein were identified by methods such as NMR analysis. The characteristics of the compounds, compositions and devices were measured by the methods described below.

NMR Analysis: A model DRX-500 apparatus made by Bruker BioSpin Corporation was used for measurement. In the measurement of $^1$H-NMR, a sample was dissolved in a deuterated solvent such as $CDCl_3$, and the measurement was carried out under the conditions of room temperature, 500 MHz and the accumulation of 16 scans. Tetramethylsilane was used as an internal standard. In the measurement of $^{19}$F-NMR, $CFCl_3$ was used as the internal standard, and 24 scans were accumulated. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

Gas Chromatographic Analysis: A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometers, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was Model C-R5A Chromatopac Integrator made by Shimadzu Corporation or its equivalent. The resulting gas chromatogram showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometers), Rtx-1 made by Restek Corporation (length 30 meters, bore 0.32 millimeter, film thickness 0.25 micrometers), and BP-1 made by SGE International Pty. Ltd. (length 30 meters, bore 0.32 millimeter, film thickness 0.25 micrometers). A capillary column CBP1-M50-025 (length 50 meters, bore 0.25 millimeter, film thickness 0.25 micrometers) made by Shimadzu Corporation may also be used for the purpose of avoiding an overlap of peaks of the compounds.

The ratio of the liquid crystal compounds included in the composition may be calculated according to the following method. A mixture of the liquid crystal compounds is analyzed by gas chromatography (FID). The ratio of peak areas in the gas chromatogram corresponds to the ratio of the liquid crystal compounds. When the capillary columns described above are used, the correction coefficient of respective liquid crystal compounds may be regarded as 1 (one). Accordingly, the ratio (percentage by weight) of the liquid crystal compounds can be calculated from the ratio of peak areas.

Samples for measurement: A composition itself was used as a sample when the characteristics of the composition or the device were measured. When the characteristics of a compound were measured, a sample for measurement was prepared by mixing this compound (15% by weight) with mother liquid crystals (85% by weight). The characteristic values of the compound were calculated from the values obtained from measurements by an extrapolation method: (Extrapolated value)=(Measured value of sample)−0.85×(Measured value of mother liquid crystals)/0.15. When a smectic phase (or crystals) deposited at 25° C. at this ratio, the ratio of the compound to the mother liquid crystals was changed in the order of (10% by weight: 90% by weight), (5% by weight: 95% by weight) and (1% by weight: 99% by weight). The values of the maximum temperature, the optical anisotropy, the viscosity and the dielectric anisotropy regarding the compound were obtained by means of this extrapolation method.

The mother liquid crystals described below were used. The ratio of the component compounds were expressed as a percentage by weight.

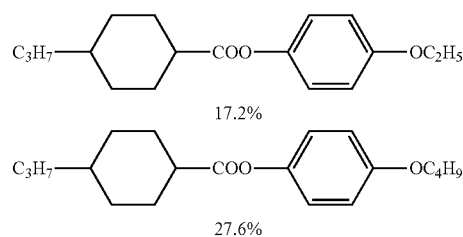

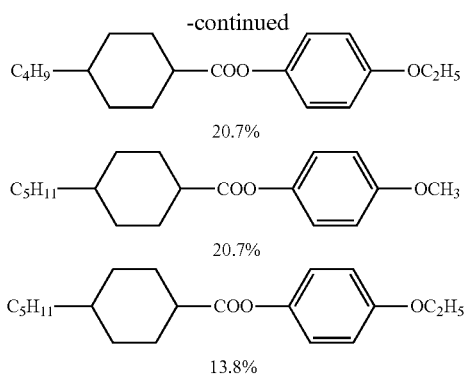

Measurement methods: The characteristics were measured according to the following methods. Most are methods described in the JEITA standards (JEITA-ED-2521B) which was deliberated and established by Japan Electronics and Information Technology Industries Association (abbreviated to JEITA), or the modified methods. No thin film transistors (TFT) were attached to a TN device used for measurement.

(1) Maximum Temperature of a Nematic Phase (NI; ° C.): A sample was placed on a hot plate in a melting point apparatus equipped with a polarizing microscope and was heated at the rate of 1° C. per minute. The temperature was measured when a part of the sample began to change from a nematic phase to an isotropic liquid. A higher limit of the temperature range of a nematic phase may be abbreviated to the "maximum temperature."

(2) Minimum Temperature of a Nematic Phase (Tc; ° C.): A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as <−20° C. A lower limit of the temperature range of a nematic phase may be abbreviated to "the minimum temperature."

(3) Viscosity (bulk viscosity; η; measured at 20° C.; mPa·s): An E-type viscometer made by Tokyo Keiki Inc. was used for measurement.

(4) Viscosity (rotational viscosity; γ1; measured at 25° C.; mPa·s): The measurement was carried out according to the method described in M. Imai, et al., Molecular Crystals and Liquid Crystals, Vol. 259, p. 37 (1995). A sample was poured into a VA device in which the distance between the two glass substrates (cell gap) was 20 micrometers. A voltage in the range of 39 volts to 50 volts was applied stepwise with an increment of 1 volt to this device. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of the dielectric anisotropy necessary for the present calculation was measured according to item (6).

(5) Optical anisotropy (refractive index anisotropy; Δn; measured at 25° C.): The measurement was carried out using an Abbe refractometer with a polarizing plate attached to the ocular, using light at a wavelength of 589 nanometers. The surface of the main prism was rubbed in one direction, and then a sample was placed on the main prism. The refractive index (n∥) was measured when the direction of the polarized light was parallel to that of rubbing. The refractive index (n⊥) was measured when the direction of polarized light was perpendicular to that of rubbing. The value of the optical anisotropy was calculated from the equation: Δn=n∥−n⊥.

(6) Dielectric anisotropy (Δε; measured at 25° C.): The value of dielectric anisotropy was calculated from the equation: Δε=ε∥−ε⊥. The dielectric constants (ε∥ and ε⊥) were measured as follows.

1) Measurement of a dielectric constant (ε∥): A solution of octadecyltriethoxysilane (0.16 mL) in ethanol (20 mL) was applied to thoroughly cleaned glass substrates. The glass substrates were rotated with a spinner, and then heated at 150° C. for one hour. A sample was poured into a VA device in which the distance between the two glass substrates (cell gap) was 4 micrometers, and then this device was sealed with a UV-curable adhesive. Sine waves (0.5 V, 1 kHz) were applied to this device, and the dielectric constant (ε∥) in the major axis direction of liquid crystal molecules was measured after 2 seconds.

2) Measurement of a dielectric constant (ε⊥): A polyimide solution was applied to thoroughly cleaned glass substrates. The glass substrates were calcined, and then the resulting alignment film was subjected to rubbing. A sample was poured into a TN device in which the distance between the two glass substrates (cell gap) was 9 micrometers and the twist angle was 80 degrees. Sine waves (0.5 V, 1 kHz) were applied to this device, and the dielectric constant (ε⊥) in the minor axis direction of liquid crystal molecules was measured after 2 seconds.

(7) Threshold voltage (Vth; measured at 25° C.; V): An LCD evaluation system Model LCD-5100 made by Otsuka Electronics Co., Ltd. was used for measurement. The light source was a halogen lamp. A sample was poured into a VA device having a normally black mode, in which the distance between the two glass substrates (cell gap) was 4 micrometers and the rubbing direction was antiparallel, and then this device was sealed with a UV-curable adhesive. The voltage to be applied to this device (60 Hz, rectangular waves) was stepwise increased in 0.02-volt increments from 0 volts up to 20 volts. The device was vertically irradiated with light simultaneously, and the amount of light passing through the device was measured. A voltage-transmittance curve was prepared, in which the maximum amount of light corresponded to 100% transmittance and the minimum amount of light corresponded to 0% transmittance. The threshold voltage was expressed as voltage at 10% transmittance.

(8) Voltage Holding Ratio (VHR-1; measured at 25° C.; %): A TN device used for measurement had a polyimide-alignment film, and the distance between the two glass substrates (cell gap) was 5 micrometers. A sample was poured into the device, and then the device was sealed with a UV-curable adhesive. A pulse voltage (60 microseconds at 5 V) was applied to the TN device and the device was charged. A decreasing voltage was measured for 16.7 milliseconds with a high-speed voltmeter, and area A between a voltage curve and a horizontal axis in a unit cycle was obtained. Area B was an area without the decrease. The voltage holding ratio was expressed as a percentage of area A to area B.

(9) Voltage Holding Ratio (VHR-2; measured at 80° C.; %): The voltage holding ratio was measured by the method described above, except that it was measured at 80° C. instead of 25° C. The results were shown by using the symbol VHR-2.

(10) Voltage Holding Ratio (VHR-3; measured at 25° C.; %): The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra-high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

(11) Voltage Holding Ratio (VHR-4; measured at 25° C.; %): A TN device into which a sample was poured was heated in a constant-temperature bath at 80° C. for 500 hours, and then the stability to heat was evaluated by measuring the voltage holding ratio. In the measurement of VHR-4, a decreasing voltage was measured for 16.7 milliseconds. A composition having a large VHR-4 has a high stability to heat.

(12) Response Time ($\tau$; measured at 25° C.; millisecond): An LCD evaluation system Model LCD-5100 made by Otsuka Electronics Co., Ltd. was used for measurement. The light source was a halogen lamp. The low-pass filter was set at 5 kHz. A sample was poured into a VA device having a normally black mode, in which the distance between the two glass substrates (cell gap) was 4 micrometers and the rubbing direction was antiparallel. This device was sealed with a UV-curable adhesive. Rectangular waves (60 Hz, 10 V, 0.5 second) were applied to this device. The device was vertically irradiated with light simultaneously, and the amount of light passing through the device was measured. The transmittance was regarded as 100% when the amount of light reached a maximum. The transmittance was regarded as 0% when the amount of light reached a minimum. The response time was expressed as the period of time required for the change from 90% to 10% transmittance (fall time: millisecond).

(13) Specific Resistance ($\rho$; measured at 25° C.; $\Omega$ cm): A sample of 1.0 milliliter was poured into a vessel equipped with electrodes. A DC voltage (10 V) was applied to the vessel, and the DC current was measured after 10 seconds. The specific resistance was calculated from the following equation. (specific resistance)=[(voltage)×(electric capacity of vessel)]/[(DC current)×(dielectric constant in vacuum)].

(14) Flicker rate (measured at 25° C.; %): A multimedia display tester 3298F made by Yokogawa Electric Corporation was used for measurement. The light source was LED. A sample was poured into an FFS device having a normally black mode, in which the distance between the two glass substrates (cell gap) was 3.5 micrometers and the rubbing direction was antiparallel. This device was sealed with a UV-curable adhesive. A voltage was applied to the device and a voltage was measured when the amount of light passed through the device reached a maximum. The sensor was approximated to the device while this voltage was applied to the device, and the flicker rate displayed was recorded.

The compounds described in Examples were expressed in terms of symbols according to the definition in Table 3 described below. In Table 3, the configuration of 1,4-cyclohexylene is trans. The parenthesized number next to a symbolized compound in Example corresponds to the number of the compound. The symbol (-) means any other liquid crystal compound. The ratio (percentage) of a liquid crystal compound means the percentages by weight (% by weight) based on the weight of the liquid crystal composition. Last, the values of characteristics of the composition are summarized.

TABLE 3

Method of Description of Compounds using Symbols
R—(A$_1$)—Z$_1$—···—Z$_n$—(A$_n$)—R'

| 1) Left-terminal Group R— | Symbol |
|---|---|
| FC$_n$H$_{2n}$— | Fn- |
| C$_n$H$_{2n+1}$— | n- |
| C$_n$H$_{2n+1}$O— | nO- |
| C$_m$H$_{2m+1}$OC$_n$H$_{2n}$— | mOn- |
| CH$_2$=CH— | V- |
| C$_n$H$_{2n+1}$—CH=CH— | nV- |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF- |
| CF$_2$=CH—C$_n$H$_{2n}$— | VFFn- |
| CH$_2$=CH—COO— | AC- |
| CH$_2$=C(CH$_3$)—COO— | MAC- |

| 2) Right-terminal Group —R' | Symbol |
|---|---|
| —C$_n$H$_{2n+1}$ | -n |
| —OC$_n$H$_{2n+1}$ | -On |
| —CH=CH$_2$ | -V |
| —CH=CH—C$_n$H$_{2n+1}$ | -Vn |
| —C$_n$H$_{2n}$—CH=CH$_2$ | -nV |
| —C$_m$H$_{2m}$—CH=CH—C$_n$H$_{2n+1}$ | -mVn |
| —CH=CF$_2$ | -VFF |
| —OCO—CH=CH$_2$ | -AC |
| —OCO—C(CH$_3$)=CH$_2$ | -MAC |
| —F | -F |
| —CN | -C |

| 3) Bonding Group —Z$_n$— | Symbol |
|---|---|
| —C$_n$H$_{2n}$— | n |
| —COO— | E |
| —CH=CH— | V |
| —C≡C— | T |
| —CH=CHO— | VO |
| —OCH=CH— | OV |
| —CH$_2$O— | 1O |
| —OCH$_2$— | O1 |

| 4) Ring —A$_n$— | Symbol |
|---|---|
| 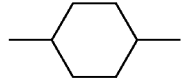 | H |
| 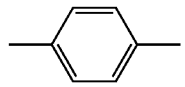 | B |
| 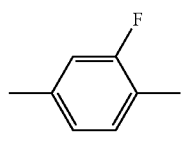 | B(F) |
| 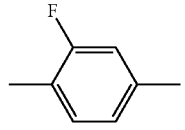 | B(2F) |

TABLE 3-continued

Method of Description of Compounds using Symbols
R—(A₁)—Z₁—⋯—Zₙ—(Aₙ)—R'

| Structure | Symbol |
|---|---|
| 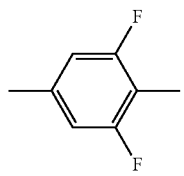 | B(F,F) |
| 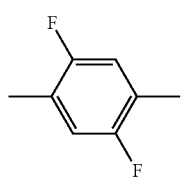 | B(2F,5F) |
| 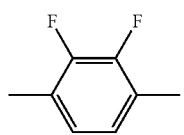 | B(2F,3F) |
| 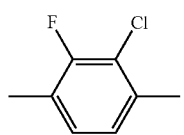 | B(2F,3CL) |
| 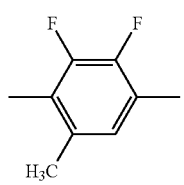 | B(2F,3F,6Me) |
| 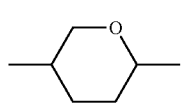 | dh |
| 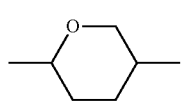 | Dh |
| 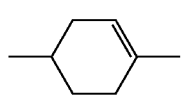 | ch |
| 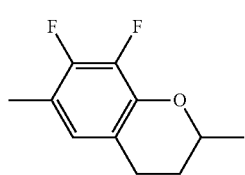 | Cro(7F,8F) |

TABLE 3-continued

Method of Description of Compounds using Symbols
R—(A₁)—Z₁—⋯—Zₙ—(Aₙ)—R'

5) Examples of Description

Example 1. V-HBB-2

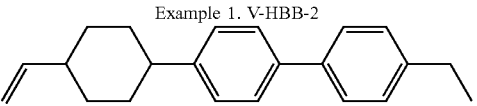

Example 2. 3-HHB(2F,3F)-O2

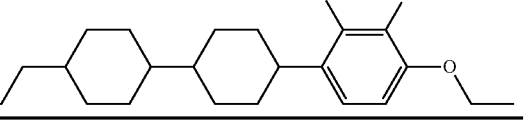

Comparative Example 1

For comparison, a composition in which compound (1) was not included was prepared. The component and the characteristics of the composition were as follows.

| Compound | | % |
|---|---|---|
| 3-HB(F)-C | (—) | 18% |
| 2-BEB(F)-C | (—) | 2% |
| 3-BEB(F)-C | (—) | 3% |
| V2-BEB(F,F)-C | (—) | 4% |
| 3-HB-O2 | (2-2) | 13% |
| 3-HHB-1 | (2-5) | 5% |
| 3-HHB-O1 | (2-5) | 3% |
| 3-HHB-3 | (2-5) | 4% |
| VFF-HHB-1 | (2-5) | 8% |
| VFF2-HHB-1 | (2-5) | 18% |
| 5-HBBH-1O1 | (—) | 4% |
| 3-HB(F)TB-2 | (—) | 6% |
| 3-HB(F)TB-3 | (—) | 6% |
| 3-HB(F)TB-4 | (—) | 6% |

NI=106.9° C.; Tc<−20° C.; Δn=0.140; Δε=8.8; Vth=1.97 V; η=22.0 mPa·s; flicker rate=1.66%.

Example 1

| Compound | | % |
|---|---|---|
| 3-HB(2F,3F)-O2 | (1-1) | 10% |
| 5-HB(2F,3F)-O2 | (1-1) | 10% |
| 3-H2B(2F,3F)-O2 | (1-3) | 10% |
| 5-H2B(2F,3F)-O2 | (1-3) | 10% |
| 3-HDhB(2F,3F)-O2 | (1-12) | 5% |
| 3-HBB(2F,3F)-O2 | (1-14) | 8% |
| 4-HBB(2F,3F)-O2 | (1-14) | 5% |
| 5-HBB(2F,3F)-O2 | (1-14) | 5% |
| V-HBB(2F,3F)-O2 | (1-14) | 5% |
| V2-HBB(2F,3F)-O2 | (1-14) | 5% |
| 3-HH-4 | (2-1) | 10% |
| V-HHB-1 | (2-5) | 11% |
| 3-HBB-2 | (2-6) | 6% |

NI=89.2° C.; Tc<−30° C.; Δn=0.111; Δε=−4.1; Vth=2.04 V; η=29.4 mPa·s; flicker rate=0.43%.

Example 2

| Compound | | % |
|---|---|---|
| 3-HB(2F,3F)-O2 | (1-1) | 10% |
| V-HB(2F,3F)-O2 | (1-1) | 7% |

-continued

| | | |
|---|---|---|
| 3-BB(2F,3F)-O2 | (1-5) | 7% |
| V2-BB(2F,3F)-O1 | (1-5) | 7% |
| 3-B(2F,3F)B(2F,3F)-O2 | (1-6) | 4% |
| 2-HHB(2F,3F)-O2 | (1-7) | 5% |
| 3-HHB(2F,3F)-O2 | (1-7) | 10% |
| 3-HBB(2F,3F)-O2 | (1-14) | 10% |
| V-HBB(2F,3F)-O2 | (1-14) | 8% |
| 2-HH-3 | (2-1) | 13% |
| 3-HB-O1 | (2-2) | 5% |
| 3-HHB-1 | (2-5) | 3% |
| 3-HHB-O1 | (2-5) | 3% |
| 3-HHB-3 | (2-5) | 5% |
| 2-BB(F)B-3 | (2-7) | 3% |

NI=73.7° C.; Tc<−20° C.; Δn=0.112; Δε=−4.2; Vth=1.96 V; η=27.4 mPa·s; flicker rate=0.31%.

Example 3

| | | |
|---|---|---|
| 3-HB(2F,3F)-O4 | (1-1) | 6% |
| 3-H2B(2F,3F)-O2 | (1-3) | 8% |
| 3-H1OB(2F,3F)-O2 | (1-4) | 5% |
| 3-BB(2F,3F)-O2 | (1-5) | 10% |
| 3-HHB(2F,3F)-O2 | (1-7) | 7% |
| V-HHB(2F,3F)-O2 | (1-7) | 7% |
| V-HHB(2F,3F)-O4 | (1-7) | 7% |
| 3-HBB(2F,3F)-O2 | (1-14) | 6% |
| V-HBB(2F,3F)-O2 | (1-14) | 6% |
| 1V2-HBB(2F,3F)-O2 | (1-14) | 5% |
| 3-HH-V | (2-1) | 11% |
| 1-BB-3 | (2-3) | 3% |
| 3-HHB-1 | (2-5) | 4% |
| 3-HHB-O1 | (2-5) | 4% |
| 3-HBB-2 | (2-6) | 5% |
| 3-B(F)BB-2 | (2-8) | 6% |

NI=89.7° C.; Tc<−30° C.; Δn=0.125; Δε=−3.9; Vth=2.16 V; η=28.9 mPa·s; flicker rate=0.23%.

Example 4

| | | |
|---|---|---|
| 3-HB(2F,3F)-O2 | (1-1) | 7% |
| 1V2-HB(2F,3F)-O2 | (1-1) | 7% |
| 3-BB(2F,3F)-O2 | (1-5) | 9% |
| 3-HHB(2F,3F)-O2 | (1-7) | 5% |
| 5-HHB(2F,3F)-O2 | (1-7) | 4% |
| 3-HH1OB(2F,3F)-O2 | (1-9) | 5% |
| 2-BB(2F,3F)B-3 | (1-10) | 4% |
| 2-HBB(2F,3F)-O2 | (1-14) | 2% |
| 3-HBB(2F,3F)-O2 | (1-14) | 8% |
| 4-HBB(2F,3F)-O2 | (1-14) | 5% |
| V-HBB(2F,3F)-O2 | (1-14) | 8% |
| 3-HH-V | (2-1) | 27% |
| 3-HH-V1 | (2-1) | 6% |
| V-HHB-1 | (2-5) | 3% |

NI=79.7° C.; Tc<−30° C.; Δn=0.107; Δε=−3.5; Vth=2.14 V; η=21.4 mPa·s; flicker rate=0.66%.

Example 5

| | | |
|---|---|---|
| 3-HB(2F,3F)-O4 | (1-1) | 15% |
| 3-chB(2F,3F)-O2 | (1-2) | 7% |
| 2-HchB(2F,3F)-O2 | (1-8) | 8% |
| 3-HBB(2F,3F)-O2 | (1-14) | 8% |
| 5-HBB(2F,3F)-O2 | (1-14) | 5% |

-continued

| | | |
|---|---|---|
| V-HBB(2F,3F)-O2 | (1-14) | 5% |
| 3-dhBB(2F,3F)-O2 | (1-15) | 5% |
| 5-HH-V | (2-1) | 20% |
| 7-HB-1 | (2-2) | 5% |
| V-HHB-1 | (2-5) | 7% |
| V2-HHB-1 | (2-5) | 7% |
| 3-HBB(F)B-3 | (2-13) | 8% |

NI=98.1° C.; Tc<−30° C.; Δn=0.109; Δε=−3.1; Vth=2.45 V; η=24.1 mPa·s; flicker rate=0.27%.

Example 6

| | | |
|---|---|---|
| 3-H2B(2F,3F)-O2 | (1-3) | 17% |
| 5-H2B(2F,3F)-O2 | (1-3) | 17% |
| 3-DhHB(2F,3F)-O2 | (1-11) | 5% |
| 3-HHB(2F,3CL)-O2 | (1-17) | 5% |
| 3-HBB(2F,3CL)-O2 | (1-18) | 8% |
| 5-HBB(2F,3CL)-O2 | (1-18) | 9% |
| 3-HH-V | (2-1) | 10% |
| 3-HH-VFF | (2-1) | 7% |
| F3-HH-V | (2-1) | 10% |
| 3-HHEH-3 | (2-4) | 4% |
| 3-HB(F)HH-2 | (2-9) | 3% |
| 3-HHEBH-3 | (2-10) | 5% |

NI=79.0° C.; Tc<−30° C.; Δn=0.082; Δε=−3.1; Vth=2.22 V; η=29.5 mPa·s; flicker rate=0.43%.

Example 7

| | | |
|---|---|---|
| 3-H2B(2F,3F)-O2 | (1-3) | 9% |
| V-HHB(2F,3F)-O2 | (1-7) | 8% |
| 2-HchB(2F,3F)-O2 | (1-8) | 8% |
| 3-HH1OB(2F,3F)-O2 | (1-9) | 3% |
| 2-BB(2F,3F)B-3 | (1-10) | 7% |
| 2-BB(2F,3F)B-4 | (1-10) | 7% |
| 3-HDhB(2F,3F)-O2 | (1-12) | 3% |
| 3-DhH1OB(2F,3F)-O2 | (1-13) | 4% |
| 4-HH-V | (2-1) | 15% |
| 3-HH-V1 | (2-1) | 6% |
| 1-HH-2V1 | (2-1) | 6% |
| 3-HH-2V1 | (2-1) | 6% |
| V2-BB-1 | (2-3) | 5% |
| 1V2-BB-1 | (2-3) | 5% |
| 3-HHB-1 | (2-5) | 4% |
| 3-HB(F)BH-3 | (2-12) | 4% |

NI=82.1° C.; Tc<−30° C.; Δn=0.107; Δε=−2.0; Vth=2.77 V; η=16.9 mPa·s; flicker rate=0.79%.

Example 8

| | | |
|---|---|---|
| V-HB(2F,3F)-O2 | (1-1) | 8% |
| 3-H2B(2F,3F)-O2 | (1-3) | 10% |
| 3-BB(2F,3F)-O2 | (1-5) | 10% |
| 2O-BB(2F,3F)-O2 | (1-5) | 3% |
| 2-HHB(2F,3F)-O2 | (1-7) | 4% |
| 3-HHB(2F,3F)-O2 | (1-7) | 7% |
| V-HHB(2F,3F)-O2 | (1-7) | 5% |
| 2-BB(2F,3F)B-3 | (1-10) | 10% |
| 2-BB(2F,3F)B-4 | (1-10) | 10% |
| 3-HDhB(2F,3F)-O2 | (1-12) | 6% |
| 2-HBB(2F,3F)-O2 | (1-14) | 5% |
| 3-HBB(2F,3F)-O2 | (1-14) | 6% |
| 3-dhBB(2F,3F)-O2 | (1-15) | 4% |

-continued

| | | |
|---|---|---|
| 3-HH1OCro(7F,8F)-5 | (1-20) | 4% |
| 3-HH-V | (2-1) | 8% |

NI=80.6° C.; Tc<−30° C.; Δn=0.138; Δε=−4.7; Vth=1.78 V; η=36.0 mPa·s; flicker rate=0.41%.

Example 9

| | | |
|---|---|---|
| 3-HB(2F,3F)-O2 | (1-1) | 7% |
| V-HB(2F,3F)-O2 | (1-1) | 8% |
| 3-H2B(2F,3F)-O2 | (1-3) | 8% |
| 3-BB(2F,3F)-O2 | (1-5) | 10% |
| 2-HHB(2F,3F)-O2 | (1-7) | 4% |
| 3-HHB(2F,3F)-O2 | (1-7) | 7% |
| V-HHB(2F,3F)-O2 | (1-7) | 5% |
| 3-HDhB(2F,3F)-O2 | (1-12) | 6% |
| 2-HBB(2F,3F)-O2 | (1-14) | 5% |
| 3-HBB(2F,3F)-O2 | (1-14) | 6% |
| V-HBB(2F,3F)-O2 | (1-14) | 5% |
| V2-HBB(2F,3F)-O2 | (1-14) | 4% |
| 3-HEB(2F,3F)B(2F,3F)-O2 | (1-16) | 4% |
| 3-H1OCro(7F,8F)-5 | (1-19) | 3% |
| 3-HH-O1 | (2-1) | 5% |
| 1-BB-5 | (2-3) | 4% |
| V-HHB-1 | (2-5) | 4% |
| 5-HBBH-3 | (2-11) | 5% |

NI=84.3° C.; Tc<−30° C.; Δn=0.122; Δε=−4.9; Vth=1.83 V; η=37.6 mPa·s; flicker rate=0.32%.

Example 10

| | | |
|---|---|---|
| V-HB(2F,3F)-O4 | (1-1) | 14% |
| V-H1OB(2F,3F)-O2 | (1-4) | 5% |
| 3-BB(2F,3F)-O2 | (1-5) | 10% |
| 3-HHB(2F,3F)-O2 | (1-7) | 7% |
| V2-HHB(2F,3F)-O2 | (1-7) | 7% |
| V-HH1OB(2F,3F)-O2 | (1-9) | 6% |
| V-HBB(2F,3F)-O4 | (1-14) | 9% |
| 1V2-HBB(2F,3F)-O2 | (1-14) | 5% |
| 3-HH-V | (2-1) | 11% |
| 1-BB-3 | (2-3) | 3% |
| 3-HHB-1 | (2-5) | 4% |
| 3-HHB-O1 | (2-5) | 4% |
| V-HBB-2 | (2-6) | 5% |
| 1-BB(F)B-2V | (2-7) | 6% |
| 5-HBBH-1O1 | (—) | 4% |

NI=92.7° C.; Tc<−30° C.; Δn=0.126; Δε=−4.1; Vth=2.14 V; η=30.9 mPa·s; flicker rate=0.53%.

In the liquid crystal display device including the composition described in Example 1 to Example 10, the flicker rate was in the range of 0.23% to 0.79%. The flicker rate of the device including the composition in Comparative Example 1 was 1.66%. The flicker rate in Examples is smaller compared to that in Comparative example, and fell into the range of 0% to 1% in this manner. It is thus concluded that the liquid crystal display device including the liquid crystal composition of the invention has excellent characteristics.

INDUSTRIAL APPLICABILITY

The liquid crystal display device of the invention has characteristics such as a short response time, a large voltage holding ratio, a low threshold voltage, a large contrast ratio, a long service life and a small flicker rate, and the flicker rate is in the range of 0% to 1%. Thus, this device can be used for a liquid crystal projector, a liquid crystal television and so forth.

What is claimed is:

1. A liquid crystal display device including a first substrate, a second substrate and a liquid crystal composition having a nematic phase, which is placed between these substrates, wherein a flicker rate is in the range of 0% to 1%, the liquid crystal composition consists essentially of at least one compound represented by formula (1) as a first component and at least one compound represented by formula (2) as a second component:

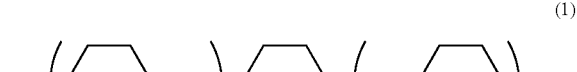

(1)

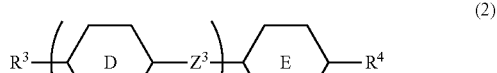

(2)

in formula (1), $R^1$ and $R^2$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by halogen; ring A and ring C are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl; ring B is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^1$ and $Z^2$ are independently a single bond, ethylene, carbonyloxy or methyleneoxy; m is 1, 2 or 3, n is 0 or 1, and the sum of m and n is 3 or less; in formula (2), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen has been replaced by halogen or alkenyl having 2 to 12 carbons in which at least one hydrogen has been replaced by halogen; ring D and ring E are independently 1,4-cyclohexylene, 1,4-phenylene, 2-fluoro-1,4-phenylene or 2,5-difluoro-1,4-phenylene; $Z^3$ is a single bond, ethylene or carbonyloxy; o is 1, 2 or 3; the liquid crystal composition does not include polymerizable compounds; and an operating mode of the liquid crystal display device is an FFS mode.

2. The liquid crystal display device according to claim 1, wherein the first component of the liquid crystal composition is at least one compound selected from the group of compounds represented by formula (1-1) to formula (1-20):

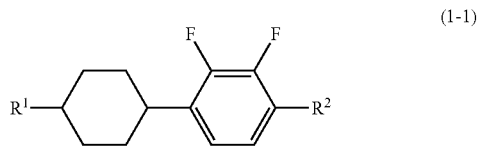

(1-1)

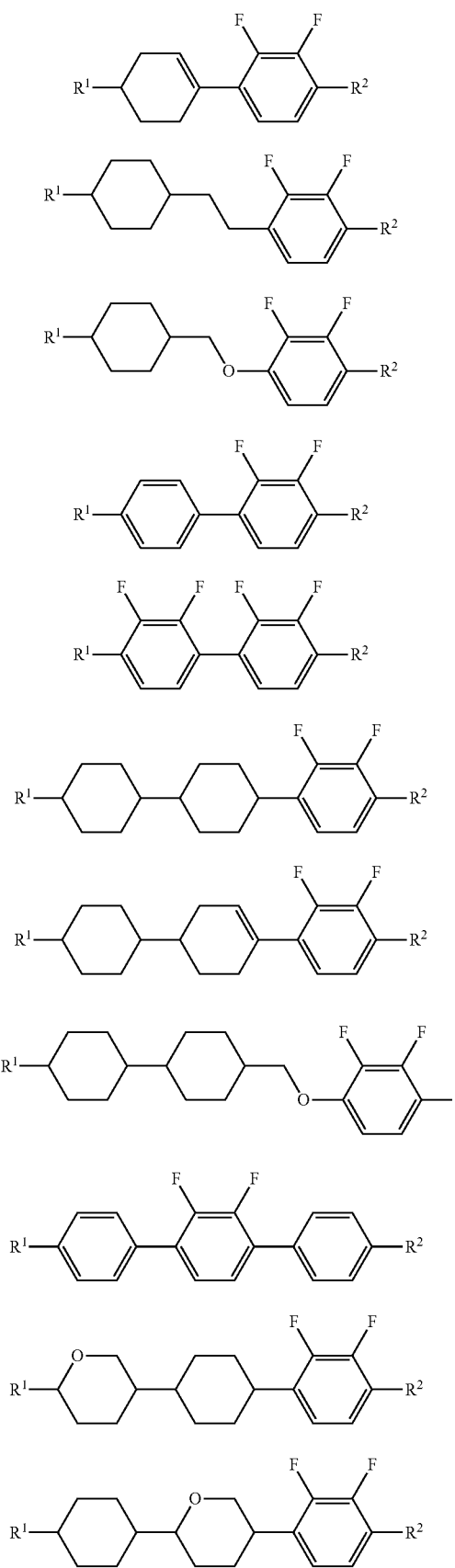
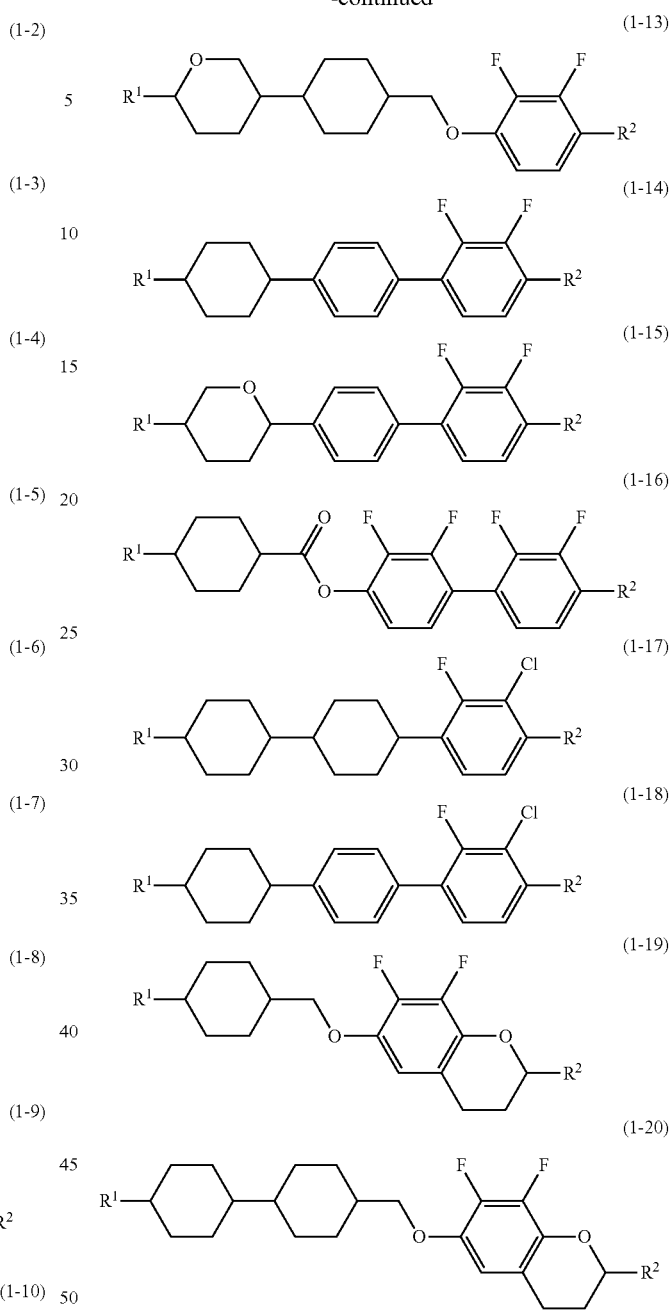

in formula (1-1) to formula (1-20), $R^1$ and $R^2$ are independently alkyl having 1 to 12 carbons, alkoxy having 1 to 12 carbons, alkenyl having 2 to 12 carbons, alkenyloxy having 2 to 12 carbons or alkyl having 1 to 12 carbons in which at least one hydrogen has been replaced by halogen.

3. The liquid crystal display device according to claim 1, wherein the ratio of the first component of the liquid crystal composition is in the range of 20% by weight to 95% by weight based on the weight of the liquid crystal composition.

4. The liquid crystal display device according to claim 1, wherein the second component of the liquid crystal composition is at least one compound selected from the group of compounds represented by formula (2-1) to formula (2-13):

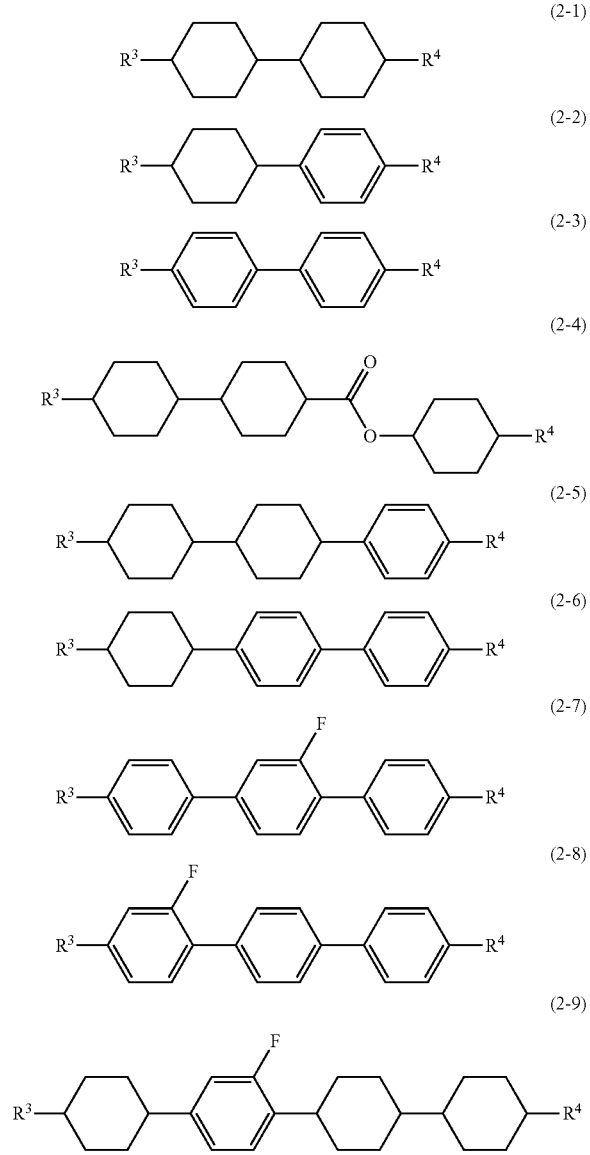
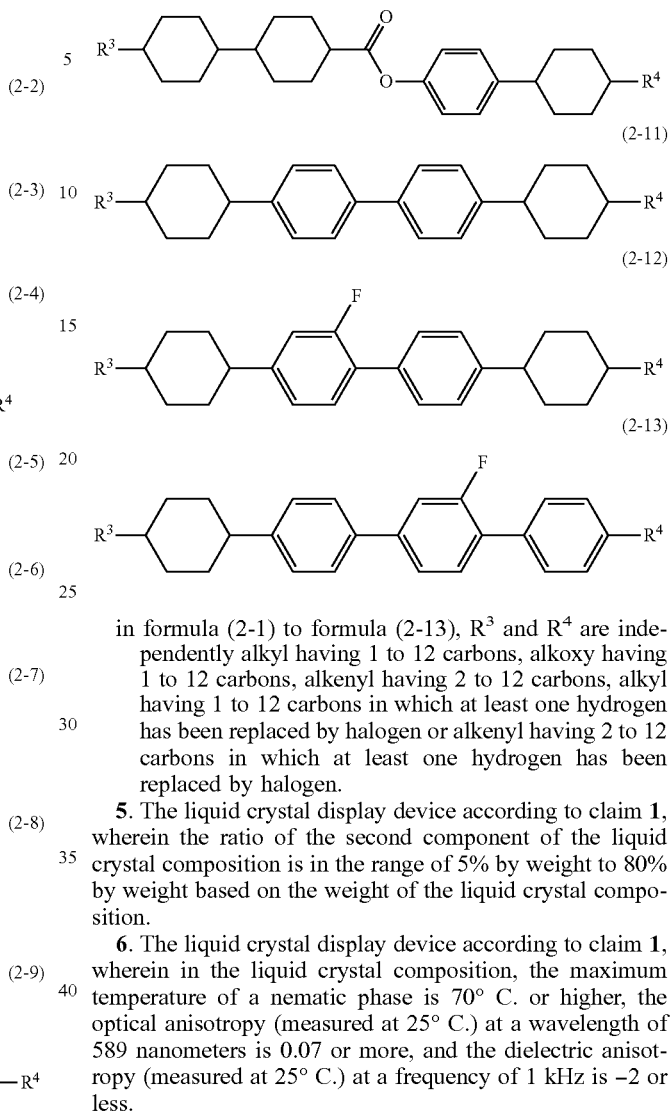

in formula (2-1) to formula (2-13), $R^3$ and $R^4$ are independently alkyl having 1 to 12 carbons, alkoxy having 1 to 12 carbons, alkenyl having 2 to 12 carbons, alkyl having 1 to 12 carbons in which at least one hydrogen has been replaced by halogen or alkenyl having 2 to 12 carbons in which at least one hydrogen has been replaced by halogen.

5. The liquid crystal display device according to claim 1, wherein the ratio of the second component of the liquid crystal composition is in the range of 5% by weight to 80% by weight based on the weight of the liquid crystal composition.

6. The liquid crystal display device according to claim 1, wherein in the liquid crystal composition, the maximum temperature of a nematic phase is 70° C. or higher, the optical anisotropy (measured at 25° C.) at a wavelength of 589 nanometers is 0.07 or more, and the dielectric anisotropy (measured at 25° C.) at a frequency of 1 kHz is −2 or less.

* * * * *